US012791162B2

(12) United States Patent
Sorensen et al.

(10) Patent No.: US 12,791,162 B2
(45) **Date of Patent: *Nov. 10, 2026**

(54) MULTI-BEAM SOLID-STATE LUMINAIRE

(71) Applicant: ABL IP Holding, LLC, Atlanta, GA (US)

(72) Inventors: Christopher Jay Sorensen, Arvada, CO (US); Ryan Matthew Walker, Colorado Springs, CO (US); Zachary Adam Ingalls, Littleton, CO (US)

(73) Assignee: ABL IP Holding, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/013,673

(22) Filed: Jan. 8, 2025

(65) Prior Publication Data

US 2025/0146646 A1 May 8, 2025

Related U.S. Application Data

(63) Continuation of application No. 18/096,675, filed on Jan. 13, 2023, now Pat. No. 12,215,854.

(51) Int. Cl.

*F21V 5/00* (2018.01)
*F21V 19/00* (2006.01)
*F21Y 115/00* (2016.01)

(52) U.S. Cl.

CPC .............. *F21V 5/007* (2013.01); *F21V 5/008* (2013.01); *F21V 19/0015* (2013.01); *F21Y 2115/00* (2016.08)

(58) Field of Classification Search

CPC ...... F21V 5/007; F21V 5/008; F21V 19/0015; F21Y 2113/13; F21Y 2105/18; F21Y 2115/00; F21Y 2115/10

See application file for complete search history.

(56) References Cited

U.S. PATENT DOCUMENTS

| | | | | |
|---|---|---|---|---|
| 9,651,222 B2 * | 5/2017 | Jørgensen | ............... | F21V 5/007 |
| 11,199,306 B2 * | 12/2021 | Bremerich | .............. | F21V 5/007 |
| 2013/0093360 A1 * | 4/2013 | Vinther | .................. | H05B 45/20 315/312 |
| 2016/0215961 A1 * | 7/2016 | Kjeldsen | ................. | F21V 5/007 |
| 2018/0073692 A1 * | 3/2018 | Jurik | ......................... | F21V 5/04 |

FOREIGN PATENT DOCUMENTS

WO WO-2015049704 A1 * 4/2015 ............. F21V 14/06

* cited by examiner

*Primary Examiner* — Zheng Song
(74) *Attorney, Agent, or Firm* — Secant IP, PLLC

(57) ABSTRACT

A multi-beam solid-state luminaire including a plurality of solid-state lamps and a plurality of beam forming optics including a first group of beam forming optics and a second group of beam forming optics. In some embodiments, the beam forming optics may be arranged in a pattern having a center, and one or more center beam forming optics of the first group may be positioned at the center of the pattern. In some embodiments, luminaire may include a first beamwidth lens positioned over the first group of beam forming optics and a second beamwidth lens positioned over the second group of beam forming optics. The beamwidth lenses may emit light from the solid-state lamps having different respective beamwidths. The luminaire may provide a decorative flame-like pattern on a target surface.

20 Claims, 11 Drawing Sheets

MULTI-BEAM SOLID-STATE LUMINAIRE

CROSS REFERENCE TO RELATED APPLICATIONS

The present application is a continuation of U.S. patent application Ser. No. 18/096,675, Filed Jan. 13, 2023, which is fully incorporated herein by reference.

TECHNICAL FIELD

The present application relates to lighting, and more particularly, to a multi-beam solid-state luminaire.

BACKGROUND

Traditionally lighting systems configured to achieve a multi-beam output have been implemented using multiple separate lighting fixtures, each having a different beam spread. These systems are generally complex and expensive. Known single fixture multi-beam lighting systems can be less expensive than a multi-fixture system but have not provided certain desirable lighting effects in a simple and cost-efficient configuration.

Figure 1:
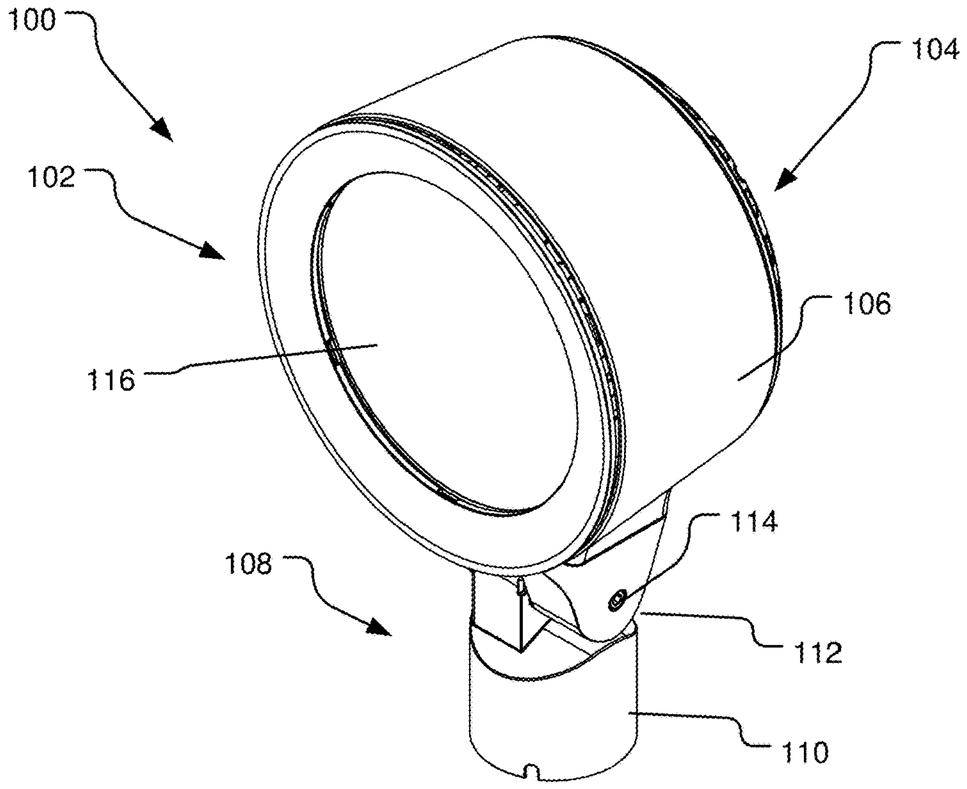
FIG. 1 is a front perspective view of one example of a luminaire consistent with the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

In accordance with an embodiment of the present disclosure, there is disclosed a luminaire having a multi-beam output. In some embodiments, the multi-beam output may include an inner beam having an inner beamwidth associated with a first group of solid-state lamps and an outer beam having an outer beamwidth associated with a second group of solid-state lamps. The outer beamwidth may be wider than the inner beamwidth, and the inner and outer beams may have different associated colors to produce a decorative flame-like illumination pattern on the target surface, such as a wall, column, floor, ceiling, etc. An elongated central color and separate surrounding color produced in a luminaire consistent with the present disclosure can also be used to highlight objects such as statues or trees that have a central elongated element and surrounding detail, such as the trunk of a tree and its surrounding branches and foliage.

Figure 2:
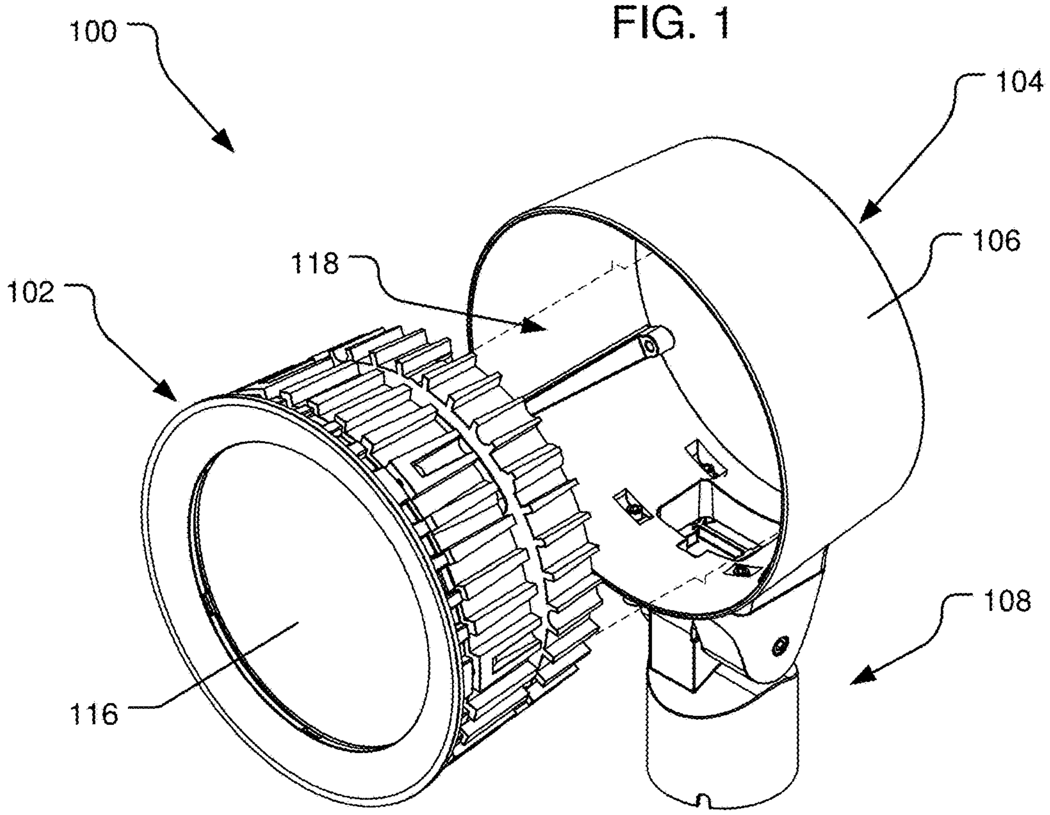
FIG. 2 is a front perspective and exploded view of the luminaire shown in FIG. 1.

FIGS. 1 and 2 illustrate one example of a luminaire 100 configured in accordance with an embodiment of the present disclosure. As shown, the illustrated example luminaire 100 includes a lighting unit 102 an optional mounting frame 104.

As shown particularly in the exploded view of FIG. 2, the mounting frame 104 may include a receptacle 106 and a mounting post 108. The receptacle may be sized and shaped to receive the lighting unit for securely coupling the lighting unit 102 to the receptacle 106. The mounting post 108 is fixed to the receptacle 106 and is configured as a knuckle mount having a fixed portion 110 coupled to a pivoting portion 112 at a pivot 114. The fixed portion 110 may be secured to a mounting location, e.g., by one or more fasteners. The pivoting portion 112 may be coupled to the receptacle 106 whereby the pivoting portion 112 and the receptacle 106 pivot together relative to the fixed portion 110 about the pivot 112. In the illustrated configuration, the lighting unit 102 may be pivoted about the pivot 112 to direct the multi-beam output of the luminaire 100 in a desired direction, e.g., against a selected target surface.

Although a specific mounting frame 104 for providing a knuckle mount configuration is illustrated herein, it is to be understood that a luminaire 100 consistent with the present disclosure can include any suitable mounting configuration for mounting the luminaire 100 in a fixed or adjustable manner to a ceiling, wall, floor, step, pavement, the ground or other suitable surface, to illuminate a target surface. In some embodiments, the mounting configuration may be a yoke-type configuration wherein a fixed portion of the mounting frame is a u-shaped yoke coupled to opposite sides of a pivoting portion. In some other embodiments, the disclosed luminaire 100 can be configured as a free-standing lighting device, such as a desk lamp or torchière lamp. In other embodiments, a luminaire 100 consistent with the present disclosure may not include any mounting frame 104 or other configuration for securing the luminaire to a fixed position. Numerous other suitable configurations will be apparent in light of this disclosure.

The lighting unit 102 includes solid-slate lamps, as described herein, for emitting a multi-beam light output from a front surface 116 of the lighting unit 102. In the illustrated example embodiment, the lighting unit 102 has a generally circular periphery and the receptacle 106 defines a generally circular opening 118 for receiving the lighting unit 102. The lighting unit 102 may be secured within the opening 118 of the receptacle 106, e.g., one or more fasteners or detents.

Figure 3:
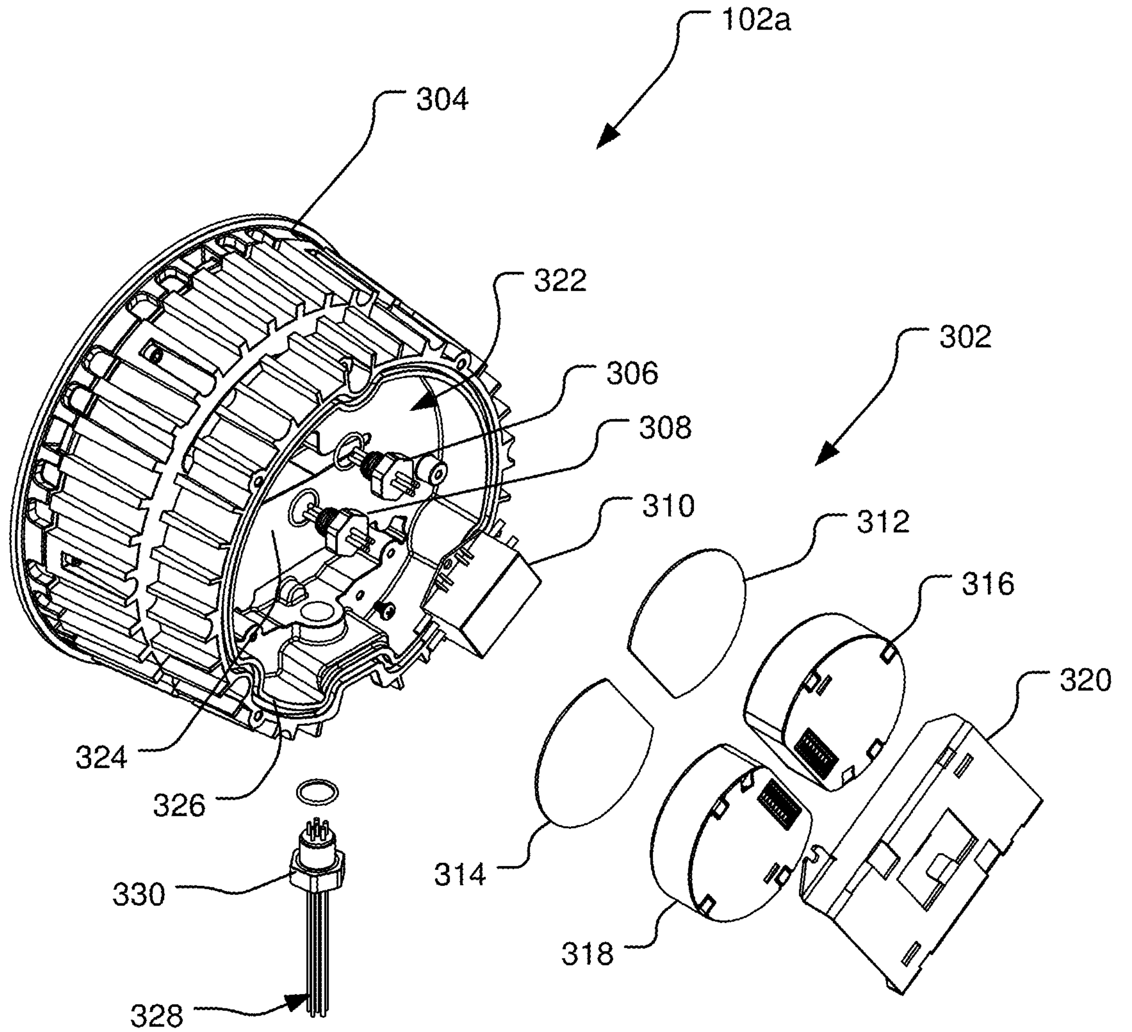
FIG. 3 is a rear perspective and exploded view of one example of a lighting unit consistent with the present disclosure.
Figure 4:
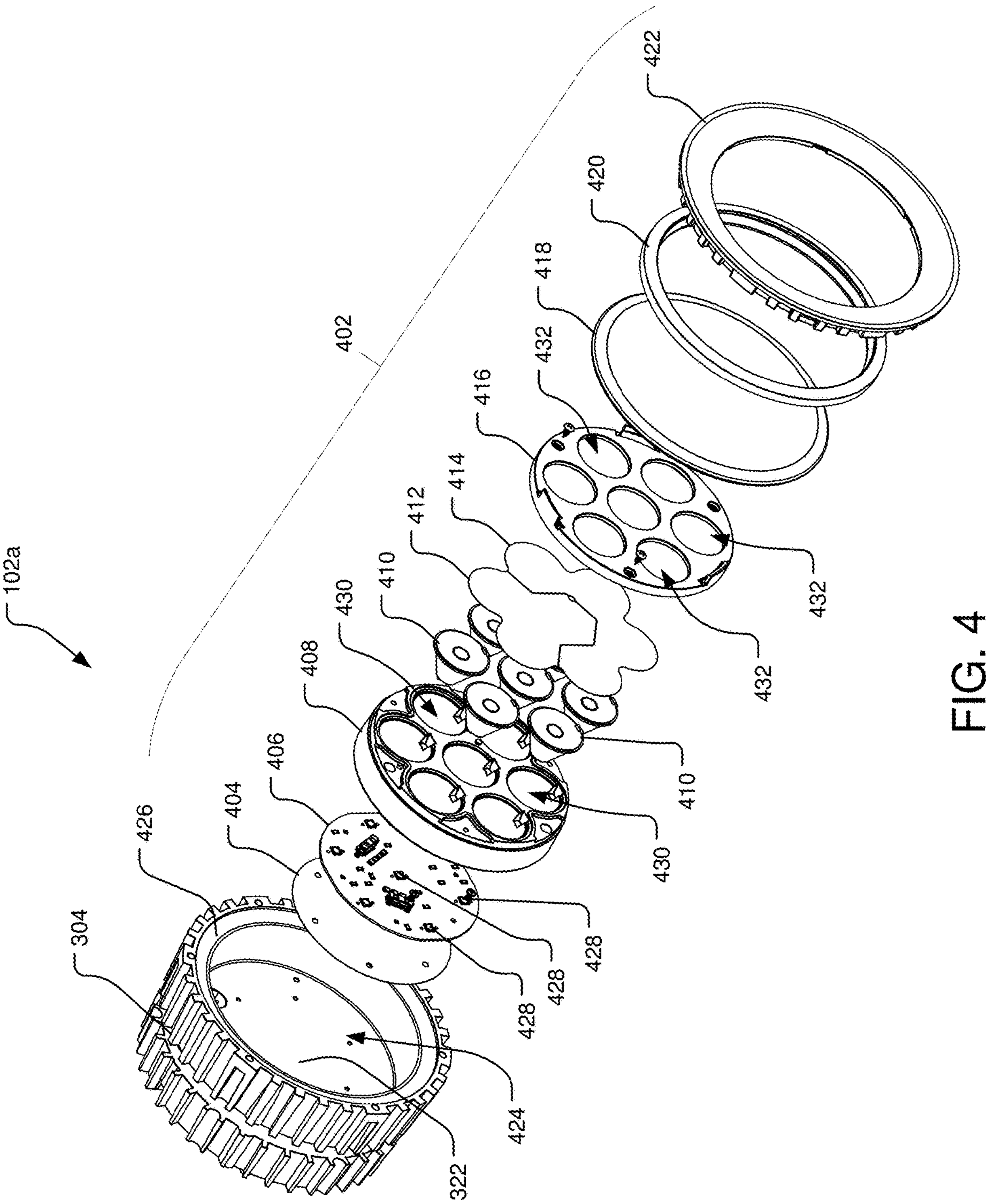
FIG. 4 is front perspective and exploded view of the lighting unit shown in FIG. 3.

FIG. 3 is a rear perspective view of one example of a lighting unit 102*a* consistent with the present disclosure showing a power supply assembly 302 thereof in exploded view with respect to a housing 304. FIG. 4 is a front perspective view of the lighting unit 102*a* with a lamp assembly 402 thereof shown in exploded view with respect to the housing 304. The lamp assembly 402 is positioned at the front of the housing 304 for emitting a multi-beam output from the front surface 116 of the lighting unit 102*a*. The power supply assembly 302 is positioned at the rear of the housing 304 for providing electrical power and, optionally, control signals to the lamp assembly 402.

The housing 304 and the mounting frame 104 may be constructed from any of a wide variety of thermally conductive materials, such as: aluminum (Al); copper (Cu); brass; steel; composites and/or polymers (e.g., ceramics, plastics, etc.) doped with thermally conductive material; and/or a combination thereof. Other suitable materials from which the housing 304 and the mounting frame 104 may be constructed will depend on a given application and will be apparent in light of this disclosure. The housing 304 may thus act as a heat sink for the lighting unit 102*a*, whereby heat generated by the lighting unit 102*a* is transferred through the housing 304 to the mounting frame 104. In the illustrated example embodiment, the exterior surface of the housing 304 includes elongate crenellations or grooves therein to facilitate heat transfer between the housing 304 and the mounting frame 104 and to allow air circulation between the housing 304 and the mounting frame 104.

As shown in FIG. 3, the power supply assembly 302 includes pass-through fittings 306, 308, a fuse 310, first 312 and second 314 gap pads, first 316 and second 318 drivers and a driver bracket 320. A rear cavity 322 is defined at the rear of the housing 304 for receiving at least a portion of the power supply assembly 302. The rear cavity 322 extends from an interior wall 324 to a rear surface 326 of the housing 304 and is generally circular in shape. The pass-through fittings 306, 308 extend through the interior wall 324 to an opposite side of the interior wall 324 to provide electrical connections from the drivers 316, 318 to associated groups of solid-state lamps in the lamp assembly 402. The first 312 and second 314 gap pads may be positioned against the internal wall 324 and the drivers 316, 318 may be positioned on associated ones of the gap pads 306, 308. The gap pads 306, 308 may be formed of an electrically insulating and thermally conductive material to provide spacing and electrical isolation for the drivers 316, 318.

A power supply/control interface cable 228 enters the housing 304 through a pass-through fitting 330 and is coupled to the drivers 316, 318 to provide electrical power to the drivers 316, 318, e.g., from a line source, and, optionally, to provide control signals to the drivers 316, 318. In some cases, the drivers 316, 318 may communicate with a system controller (not shown) utilizing a digital communications protocol, such as a digital multiplexer (DMX) interface, a Wi-Fi™ protocol, a digital addressable lighting interface (DALI) protocol, a ZigBee protocol, or any other suitable communications protocol, wired and/or wireless (e.g., radio-based or optical), as will be apparent in light of this disclosure.

Figure 5:
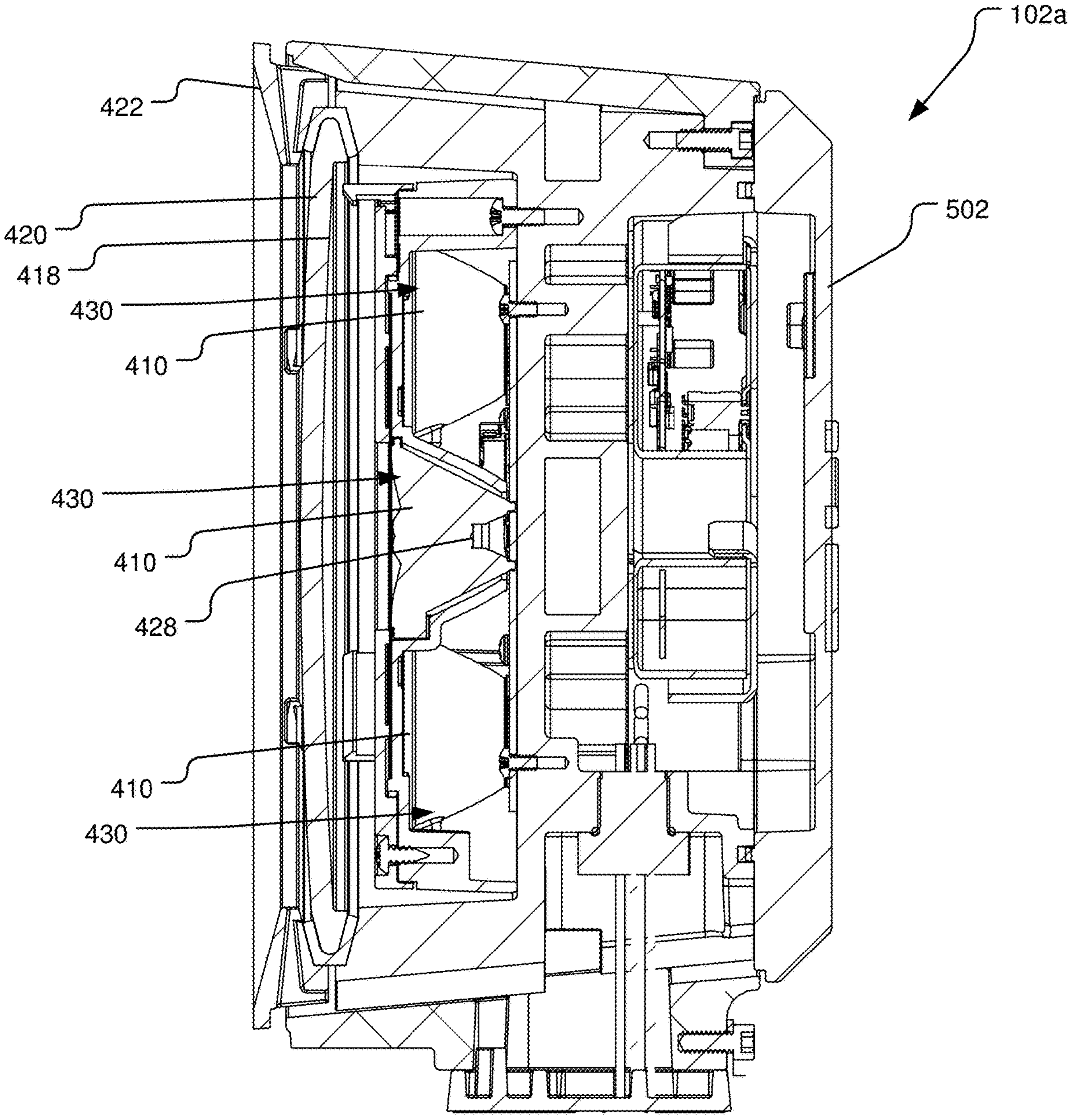
FIG. 5 is a cross-sectional view of the lighting unit shown in FIGS. 3 and 4.

The drivers 316, 318 may take known configurations for receiving input voltage and, optionally, control signals from the power supply/control interface cable 228 and providing an output to solid-state lamps of the lamp assembly 402 through the pass-through fittings 306, 308. In one embodiment, for example, the drivers 316, 318 may be known DMX drivers. In the illustrated example embodiment, the first driver 316 is coupled for driving a first group of the solid-state lamps and the second driver 318 is coupled for driving a second group of the solid-state lamps. Although two drivers 316, 318 for driving two separate groups of solid-state lamps are provided in the embodiment of FIG. 3, any number of drivers 316, 318 may be provided for separately driving any number of groups solid-state lamps. The drivers 316, 318 may be secured within the rear cavity 322 by the driver bracket 320 and the rear cavity 322 may be closed by a cover 502 (FIG. 5) secured to the housing 304.

As shown in FIG. 4, the lamp assembly 402 includes a gap pad 404, a printed circuit board assembly (PCBA) 406, an optic holder 408, a plurality of beam forming optics 410, first 412 and second 414 beamwidth lenses, an optic retainer 416, a sealing lens 418, a gasket 420, and a retainer 422. The lighting unit 102*a* is generally circular in shape, i.e., is of generally circular cross section having a diameter greater than its thickness. It will be appreciated that the cross-sectional shape of the lighting unit 102*a* may be generally defined by the shape of the PCBA 406, as are the dimensions of the luminaire 100 and the mounting frame 104. In some embodiments, the lighting unit 102*a* may have a diameter between about 8 inches and 17 inches and a thickness of between about 2 inches and 4 inches, although it will be appreciated that the diameter, thickness and/or shape of the lighting unit 102*a* may be larger or smaller depending on the application, the target surface, and/or the desired illumination effects.

The lamp assembly 402 is provided at the front of the housing 304. A front cavity 424 is defined at the front of the housing 304 for receiving at least a portion of the lamp assembly 402. The cavity extends from the interior wall 324 to a front surface 426 of the housing 304 and is generally circular in shape.

The gap pad 404 is disposed against the interior wall 324 and the rear surface of the PCBA 406 is positioned adjacent the front surface of the gap pad 404. The gap pad 404 thus enhances thermal conductivity, spaces, and electrically isolates the PCBA 406 and the components thereon from the interior wall 324 of the housing 304. As described herein, the PCBA 406 includes first and second pluralities of solid-state lamps 428 operatively mounted on a front surface thereof. The PCBA 406 includes conductive traces and/or wires to electrically couple the solid-state lamps 428 to appropriate electronics to drive the solid-state lamps for emitting a desired light output. The features and quantity/density of solid-state lamps 428 utilized in the lighting unit 102*a* may be customized, as desired to provide illumination for a given target application or end-use. Numerous suitable configurations will be apparent in light of this disclosure.

A given solid-state lamp 428 may include one or more solid-state emitters, either in a common package or separately packaged and clustered together. A given solid state lamp 428 may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-amber (RGBA); (3) red-green-blue-white (RGBW); (4) dual-white; and/or (5) a combination of any one or more thereof. As used herein, the term "color" generally is used to refer to a property of radiation that is perceivable by an observer (though this usage is not intended to limit the scope of this term). Accordingly, the term "different colors" implies two different spectra with different wavelength components and/or bandwidths. In addition, "color" may be used to refer to white and non-white light, and where two white lights of varying CCT constitute being a different "color" than each other.

The optic holder 408 has a rear surface positioned in opposed facing relationship to the front surface of the PCBA 406. The optic holder 408 may be constructed from an electrically isolating material and defines a plurality of receptacles 430 therein for receiving associated ones of the plurality of beam forming optics 410. The receptacles 430 may have a shape and dimension corresponding to the shape and dimensions of the beam forming optics 410. For generally conically shaped beam forming optics 410, e.g., as shown in FIG. 4 for example, the receptacles 430 may have a generally conical shape, e.g., as shown in the sectional view of FIG. 5. When the beam forming optics 410 are disposed in associated ones of the receptacles 430, each of the beam forming optics is positioned over an associated one of the solid-state lamps 428 on the PCBA 406, e.g., as shown in the sectional view of FIG. 5. Light emitted from each of the solid-state lamps 428 is thus imparted on a bottom surface of an associated one of the beam forming optics 410 and is emitted from a top surface of the associated one of the beam forming optics 410.

In some embodiments, each of the beam forming optics 410 may be configured to concentrate, e.g., collimate, light emitted from an associated one of the solid-state lamps and emit a concentrated light output from a top surface thereof. In some embodiments, the one or more of the beam forming optics 410 may be configured to emit light having a desired beamwidth. For example, the output beamwidth of the beam forming optics 410 associated with a first group of solid-state lamps may be different from the output beamwidth of the beam forming optics associated with a second group of solid-state lamps to provide a decorative flame-like light output for the luminaire, as described herein.

The beam forming optics 410 may include an reflective material, such as a reflective metal, and/or an optical structure comprising any of a wide variety of transparent/translucent materials, such as, for example: a polymer, such as poly(methyl methacrylate) (PMMA) or polycarbonate; a ceramic, such as sapphire (Al2O3) or yttrium aluminum garnet (YAG); a glass; and/or any combination thereof. Numerous suitable configurations of the beam forming optics 410 will be apparent in light of the present disclosure. The beam forming optics 410 may perform beam forming by optical reflection, refraction, total internal reflection (TIR), or any combination thereof.

Figure 6:
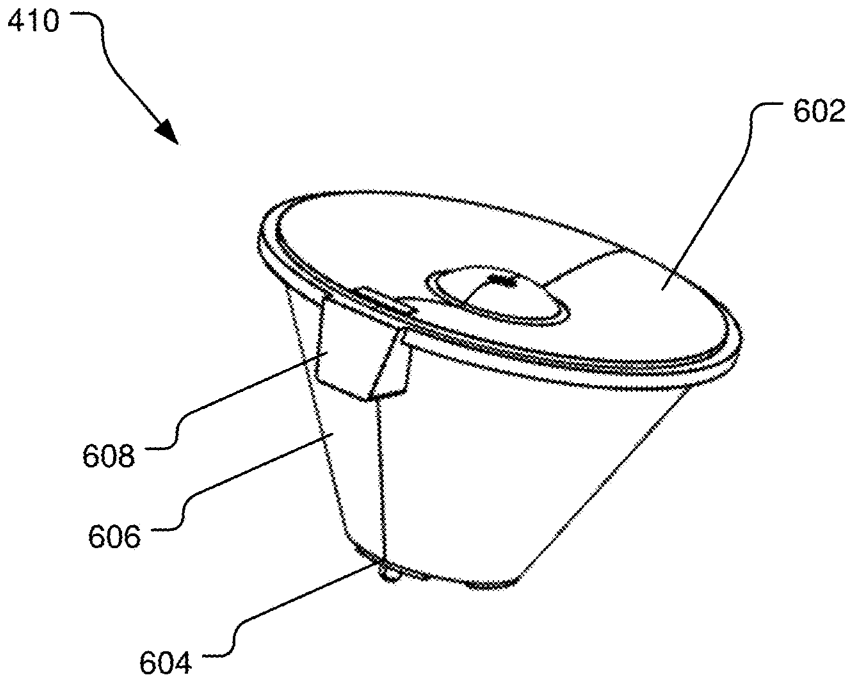
FIG. 6 is a top perspective view of a beam forming optic shown in FIG. 4.
Figure 7:
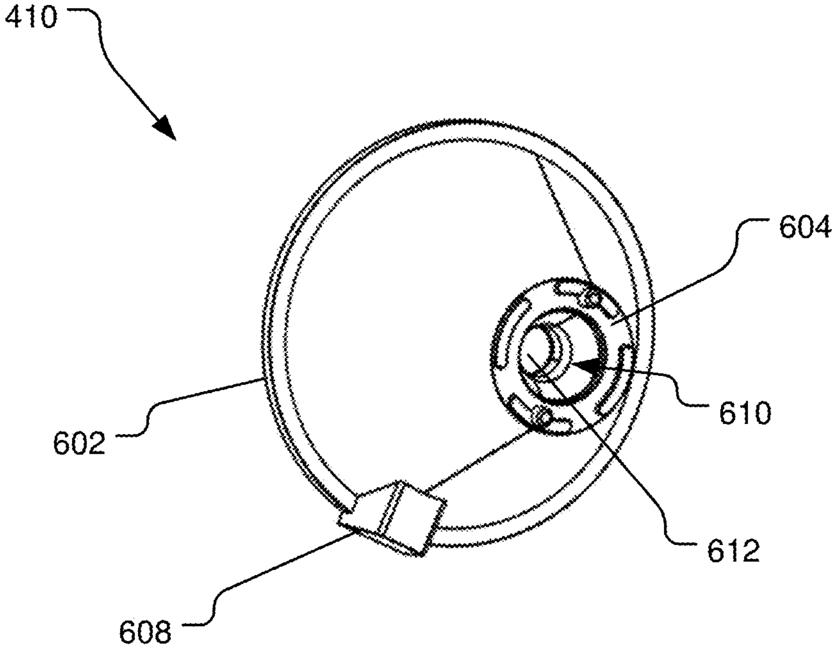
FIG. 7 is a bottom perspective view of the beam forming optic shown in FIG. 4.

FIGS. 6 and 7 illustrate one of the beam forming optics 410 in greater detail. The illustrated example beam forming optic 410 has a generally conical shape with a top surface 602, a bottom surface 604, a side surface 606 and a shelf 608 extending outwardly from the side surface 606 adjacent the top surface 602. The shelf 608 is positioned for resting on corresponding shelf in the optic holder 408 to support and/or orient the beam forming optic 410 in an associated receptacle 430 of the optic holder 408 with the top surface 602 of the beam forming optic 410 generally co-planar with the top surface of the optic holder 408.

A cavity 610 is defined by the bottom surface 602 of the beam forming optic 410. The cavity 610 is sized and shaped to receive a top portion of an associated one of the solid-state lamps 428, as shown for example in FIG. 5. Light emitted from the solid-state lamp 428 is directed against a portion the bottom surface 602 defining a bottom 612 of the cavity 610, passes through the beam forming optic 410 and is emitted from the top surface 602 of the beam forming optic 410. The beam forming optic 410 may be configured so that the light emitted from the top surface has a desired optical quality, e.g., the light is concentrated and/or has a desired beamwidth.

Turning again to FIG. 4, the rear surface of the first 412 and second 414 beamwidth lenses may be positioned in opposed facing relationship to the top surface of the optic holder 408 and the top surfaces of the beam forming optics 410 disposed in the receptacles 430 of the optic holder 408. The first beamwidth lens 412 is positioned over a first group of the beam forming optics 410 and the second beamwidth lens 414 is positioned over a second group of the beam forming optics 410. Light emitted from each of the solid-state lamps 428 in the first group is thus imparted on a bottom surface of the first beamwidth lens 412 and is emitted from a top surface of the first beamwidth lens 412. Light emitted from each of the solid-state lamps 428 in the second group is imparted on a bottom surface of the second beamwidth lens 414 and is emitted from a top surface of the second beamwidth lens 414.

In some embodiments, the beamwidth lenses 412, 414 may be configured to emit light having different associated beamwidths. For example, the light emitted by the first beamwidth lens 412 may have a first beamwidth and the light emitted by the second beamwidth lens 414 may have a second beamwidth that is larger than the first beamwidth to provide a decorative flame-like light output for the luminaire, as described herein. In embodiments, where the beam forming optics 410 are configured to provide the desired associated output beamwidths one or both of the beamwidth lenses 412, 414 may be omitted from the lamp assembly 402.

The beamwidth lenses 412, 414 may each include an optical structure comprising any of a wide variety of transparent/translucent materials, such as, for example: a polymer, such as poly(methyl methacrylate) (PMMA) or polycarbonate; a ceramic, such as sapphire (Al2O3) or yttrium aluminum garnet (YAG); a glass; and/or any combination thereof. The beam width lenses 412, 414 may broaden or otherwise diffuse light passing therethrough, e.g., via macro or micro geometry on their surfaces and/or scattering structures within their volume. In some embodiments, the beamwidth lenses 412, 414 may be in the form of a thin sheet or film. Numerous suitable configurations of the beamwidth lenses will be apparent in light of the present disclosure.

In the illustrated example embodiment, the beamwidth lenses 412, 414 are formed as films having a thickness of about 0.010 inches and are positioned to be generally co-planar top surfaces. The shape of the first beamwidth lens 412 generally corresponds to the shape associated with the first group of beam forming optic 410 over which the first beamwidth lens 412 is positioned, whereby light emitted from the each of the first group of beam forming optics 410 passes through the first beamwidth lens 412. The shape of the second beamwidth lens 414 generally corresponds to the shape associated with the second group of beam forming optic 410 over which the second beamwidth lens 414 is positioned, whereby light emitted from the each of the second group of beam forming optics 410 passes through the second beamwidth lens 414.

Figure 8:
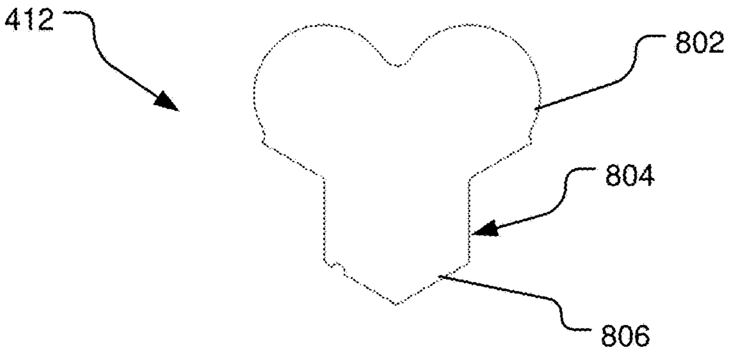
FIG. 8 is a top view of the first beamwidth lens shown in FIG. 4.
Figure 9:
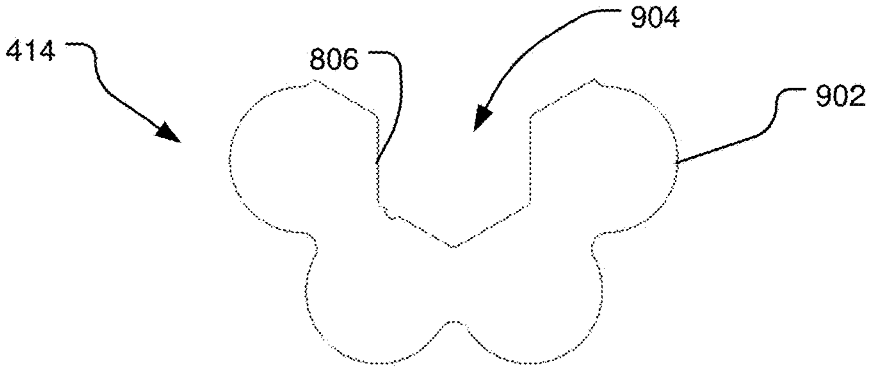
FIG. 9 is a top view of the second beamwidth lens shown in FIG. 4.
Figure 10:
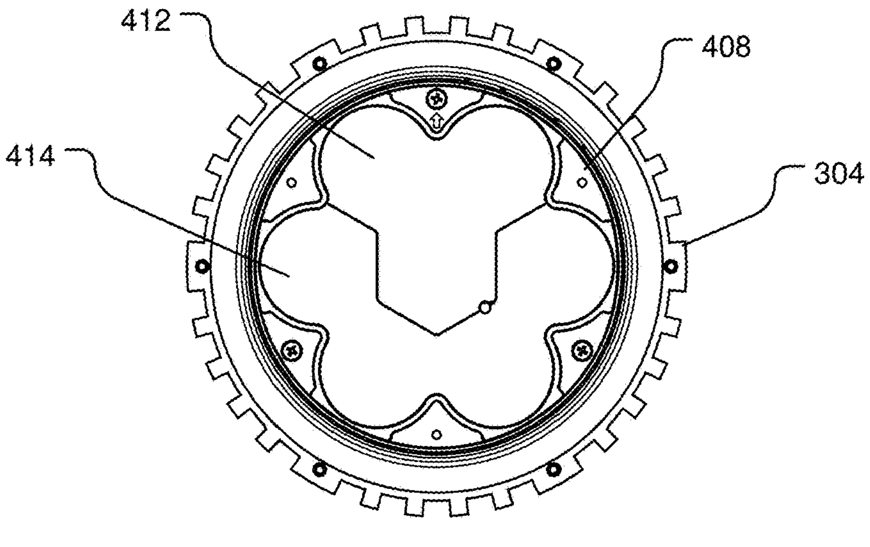
FIG. 10 is a top view of a portion of the lighting unit shown in FIG. 4 showing the first and second beam forming optics positioned over the optic holder.

The first 412 and second 414 beamwidth lenses are shown more particularly in FIGS. 8 and 9, respectively. As shown in FIG. 8, the first beamwidth lens has a perimeter 802 defining a projection 804, and the second beamwidth lens has a permitter 902 defining a central opening 904. The projection 804 of the first beamwidth lens 412 may be configured to be received in the central opening 904 of the second beamwidth lens 414. As shown in FIG. 4 and in FIG. 10, the portion, e.g., 806, of the perimeter 802 of the first beamwidth lens 412 defining the projection 804 is complementary to the portion, e.g., 906, of the perimeter 903 of the second beamwidth lens 414 defining the central opening 904. In this example configuration surfaces defining the perimeter of the projection 804 are in opposed facing relationship to corresponding surfaces defining the perimeter of the central opening 904 so that light emanating from the beam forming optics 412, 414 passes through the first beamwidth lens 412 or the second 414 beamwidth lens.

Although example embodiments may be described herein as including a single beamwidth lens positioned over all of the beam forming optics of an associated group of beam forming optics, it is to be understood that any number of beamwidth lenses may be provided in a luminaire consistent with the present disclosure. For example, each of the beam forming optics may have a different associated beamwidth lens positioned thereover. In some embodiments, a single beamwidth lens may be positioned over a subset of a group of beam forming optics and one or more remaining ones of the group may have different associated beamwidth lenses positioned thereover. Numerous configurations of the beamwidth lenses and are possible in a luminaire consistent with the present disclosure.

Turning again to FIG. 4, the bottom surface of the optic retainer 416 is positioned in opposed facing relationship to the top surfaces of the first 412 and second 414 beamwidth lenses to secure the beam forming optics 410 and the beamwidth lenses 412, 414 in the lighting unit 102*a*. The optic retainer 416 is formed of a generally opaque material and has apertures 432 formed therein corresponding to the locations of the beam forming optics 410 positioned thereunder. Light emitted from the top surface of the beam forming optics 410 passes through an associated one of the beamwidth lenses 412, 414 and then through an associated one of the apertures 432 in the optic retainer 416. The optic retainer 416 thus blocks any light emitted from the top surfaces of the first 412 or second 412 beamwidth lenses that is not aligned with one of the apertures 432 in the optic retainer 416.

The sealing lens 418 is positioned over the optic retainer 416 and an annular gasket 420 is positioned over the sealing lens 418. The sealing lens 418 may be an optical structure comprising any of a wide variety of transparent/translucent materials, such as, for example: a polymer, such as poly (methyl methacrylate) (PMMA) or polycarbonate; a ceramic, such as sapphire (Al2O3) or yttrium aluminum garnet (YAG); a glass; and/or any combination thereof. In some embodiments, sealing lens 418 may have optical properties for emitting light having a desired optical property. For example, in some embodiments the sealing lens 418 may be configured as a diffuser. In other embodiments, the sealing lens 418 may be configured to alter light imparted thereon or provide a light output having a desired beamwidth. Numerous suitable configurations of the sealing lens 418 will be apparent in light of the present disclosure.

The retainer 422 is positioned over the gasket 420 and is secured to the top surface of the housing 304, e.g., by appropriate fasteners. Light emitted from an aperture 432 of the optic retainer 416 passes through the sealing lens 418 to provide the output light of the luminaire 100.

Figure 11:
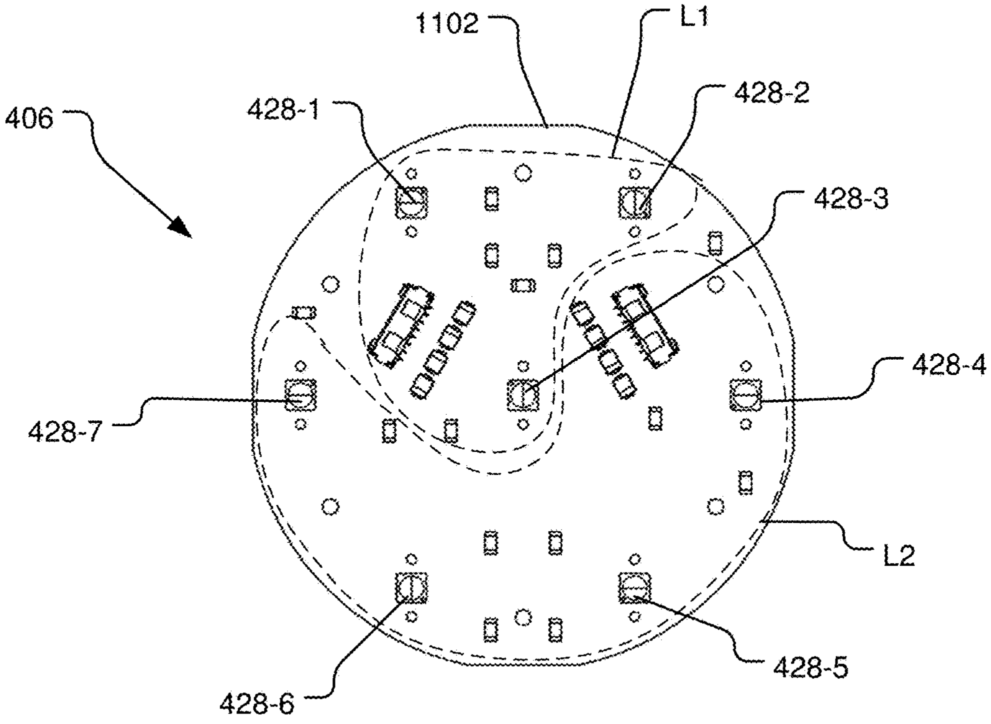
FIG. 11 is a top view of a portion of the printed circuit board assembly (PCBA) shown in FIG. 4.
Figure 12:
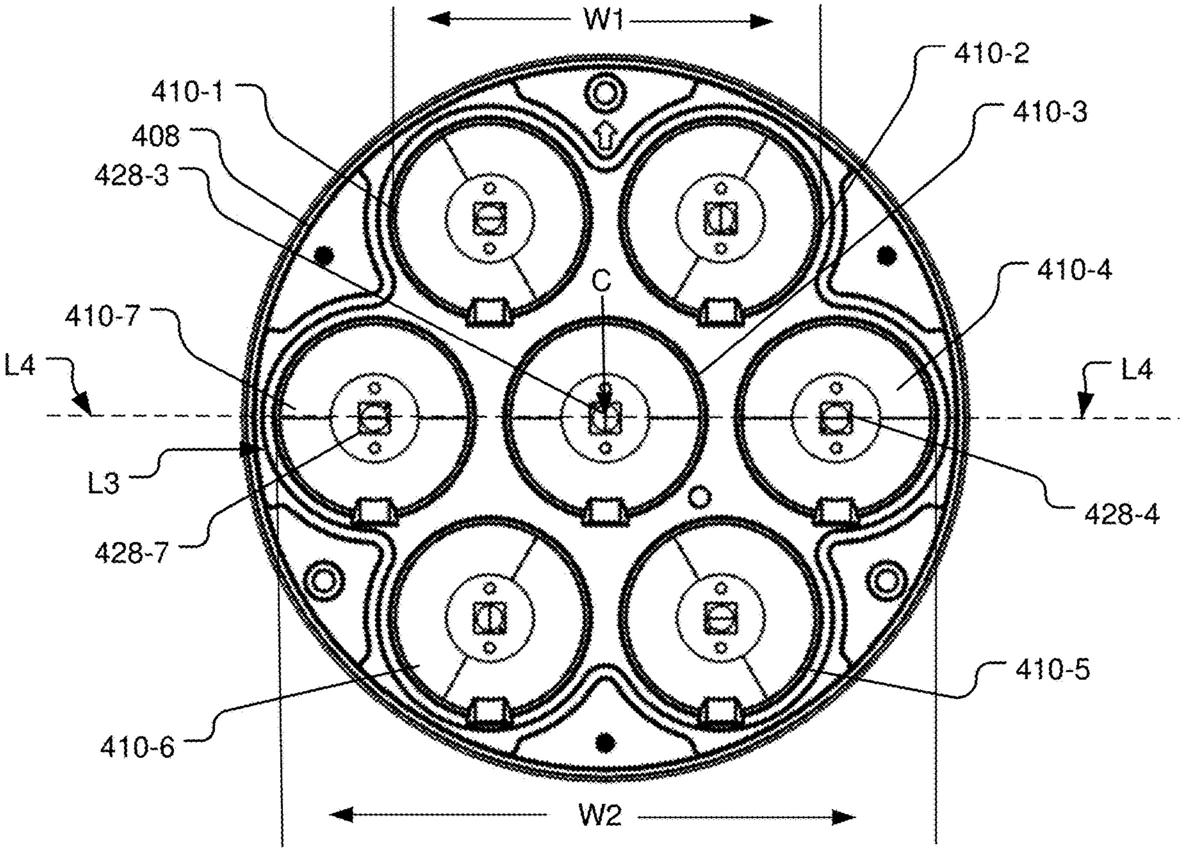
FIG. 12 is a top view of a portion of the lighting unit shown in FIG. 4 showing the optic holder and beam forming optics positioned over the solid-state lamps.

FIG. 11 is a front view of the PCBA 406 shown in FIG. 4. In the illustrated example, the PCBA 406 includes a single printed circuit board (PCB) 1102 with the plurality of solid-state lamps 428 mounted thereon. In FIGS. 11 and 12 the individual ones of the solid-state lamps 428 are identified using the reference numeral 428 and an associated numerical suffix, such as 428-1, 428-2, etc. The plurality of solid-state lamps includes a first group 428-1, 428-2, 424-3 of solid-state lamps generally located within the boundaries of a first area indicated by dashed line L2 and a second group 428-4, 428-5, 424-6, 428-7 of solid-state lamps generally located within the boundaries of a second area indicated by dashed line L3. The first 428-1, 428-2, 424-3 and second 428-4, 428-5, 424-6, 428-7 groups of solid-state lamps may be driven by separate drivers of the power supply assembly 302 or may be driven by a single driver.

In some embodiments, a total number of solid-state lamps 428 configured for emitting light from the luminaire may be equal to the total number of solid-state lamps in the first group plus the total number of solid-state lamps in the second group. For example, in the illustrated example embodiment, a total of 7 solid-state lamps 428 are mounted to the PCB and there are 3 solid-state lamps 428-1, 428-2, 424-3 in the first group of solid-state lamps and 4 solid-state lamps in the second group 428-4, 428-5, 424-6, 428-7 of solid-state lamps. The ratio of the number of solid-state lamps 428 in the first group to the number of solid-state lamps in the second group is thus 0.75 when the total number of solid-state lamps 428 in the first group (i.e., 3) plus the number of solid-state lamps 428 in the second group (i.e., 4) is equal to the total number of solid-state lamps 428 provided in the luminaire (i.e., 7).

Although a specific number of solid-state lamps 428 is shown, a system consistent with the present disclosure may include any number of solid-state lamps 428 and any number and any number of solid-state lamps 428 may be included in the first group and the second group. Also, numerous ratios of the number of solid-state lamps 428 in the first group to the number of solid-state lamps 428 in the second group are possible. In some embodiments, the ratio of the number of solid-state lamps 428 in the first group to the number of solid-state lamps 428 in the second group is greater than or equal to 0.6 and less than or equal to 1.2 when the number of solid-state lamps 428 in the first group plus the number of solid-state lamps 428 in the second group is equal to the total number of solid-state lamps 428 provided in the luminaire.

The solid-state lamps 428-1, 428-2, 424-3 in the first group of solid-state lamps may be configured to emit light of a different color than the light emitted by the solid-state lamps 428-4, 428-5, 424-6, 428-7 of the second group. In some embodiments, for example, all of the plurality of solid-state lamps 428 may be of the same type, e.g., RGB LEDs, but controlled so that the solid-state lamps 428-1, 428-2, 424-3 of the first group emit a different color than the solid-state lamps 428-4, 428-5, 424-6, 428-7 of the second group. In other embodiments, the solid-state lamps 428 of the first and second groups may be single color lamps of different colors. Numerous configurations of the solid-state lamps 428 for achieving different color outputs from the first group 428-1, 428-2, 424-3 of solid-state lamps and the second group 428-4, 428-5, 424-6. 424-7 solid-state lamps are possible.

FIG. 12 is a front plan view of the optic holder 408 with beam forming optics 410 positioned therein and disposed over the solid-state lamps 428. In FIG. 12 individual ones of the beam forming optics 410 are identified using the reference numeral 410 and an associated numerical suffix, such as 410-1, 410-2, etc. The beam forming optics 410 includes a first group 410-1, 410-2, 410-3 of beam forming optics, each of which is positioned over an associated one of the first group of solid-state lamps 428 and a second group 410-4, 410-5, 410-6, 410-7 of beam forming optics, each of which is positioned over an associated one of the second group of solid-state lamps 428. The beam forming optics 410 are arranged in a pattern corresponding to the pattern of the solid-state lamps 428 mounted to the PCB, whereby light emitted from the each of the solid-state lamps 428 passes through an associated one of the beam forming optics 410.

The pattern in which the beam forming optics 410 are arranged has a center C, e.g., at the center of the solid-state lamp 428-3 and the beam forming optic 410-3. The first group of beam forming optics includes center beam forming optic 410-3, that is arranged at the center C of the pattern. The phrase "at the center" as used herein with respect to the location of a single center beam forming optic 410 with respect to pattern in which the beam forming optics 410 are arranged means the single center beam forming lens, e.g., beam forming optic 410-3, overlies the center C of the pattern and does not require that the center of the center beam forming optic be precisely aligned with the center C of the pattern.

In the illustrated embodiment, the beam forming optics 410 may be considered as being arranged in a circular, hexagonal or other 2-dimensional pattern (in a plan view) where all of the beam forming optics 410-1, 410-2 . . . 410-7 are within the internal area defined by the circle, hexagon or other pattern and the center beam forming optic 410-3 is arranged at the center C of the circle, hexagon or other pattern. For example, the beam forming optics in FIG. 4 may be viewed as being arranged in a scalloped circle pattern generally following line L3 and encompassing all of the beam forming optics 410. The center beam forming optic 410-3 of the first group beam forming optics is at the center C of the scalloped circle pattern.

Each of the second group 410-4, 410-5, 410-6, 410-7 of beam forming optics is further from the center C of the pattern than the center beam forming optic 410-3. In some embodiments, with respect to an imaginary line L4 horizontally bisecting the pattern and extending through the center C of the pattern, there are more complete beam forming optics 410 of the first group of beam forming optics than of the second group of beam forming optics on one side of the line and, on the other side of the line, there are more complete beam forming optics 410 of the second group of beam forming optics than of the first group of beam forming optics. In FIG. 4, for example, above the line L4 there are two complete beam forming optics of the first group, i.e., beam forming optics 410-1 and 410-2, and there are no complete beam forming optics of the second group. Below the line L4 there are two complete beam forming optics of the second group, i.e., beam forming optics 410-5 and 410-6, and there are no complete beam forming optics of the first group.

In some embodiments, the first group beam 410-1, 410-2, 410-3 beam forming optics is arranged in a first shape and the second group 410-4, 410-5, 410-6, 410-7 of beam forming optics is arranged in a second shape. The second shape may define a central opening and wherein at least a portion of the first shape extends into the central opening. In FIG. 4, for example, the first group 410-1, 410-2, 410-3 of beam forming optics may be arranged in a first shape similar to the shape of the first beamwidth lens 412 shown in FIG. 8, and the second group 410-4, 410-5, 410-6, 410-7 of beam forming optics may be arranged in a second shape similar to the shape of the second beamwidth lens 414 shown in FIG. 9. The first shape has a projection, similar to the projection 804 of the first beamwidth lens 412 in FIG. 8 and the second shape has a central opening similar to the central opening 904 of the second beamwidth lens 414 in FIG. 9. The projection may of the first shape is received in the central opening of the second shape.

In some embodiments, the maximum width of the first group of beam forming optics 410 is less than the maximum width of the second group of beam forming optics 410. The "maximum width" of a group of beam forming optics 410 as used herein means the maximum Euclidean distance between the left-most point on the left-most one of beam forming optics 410 of a group and the right-most point on the right-most one of the beam forming optics 410 of a group. In FIG. 4, for example, the maximum width of the first group of beam forming optics is W1 and the maximum width of the second group of beam forming optics is W2. The width W1 is less than the width W2. In some embodiments, the ratio of the width W1 to W2 is less than or equal to 0.75.

Figure 13:
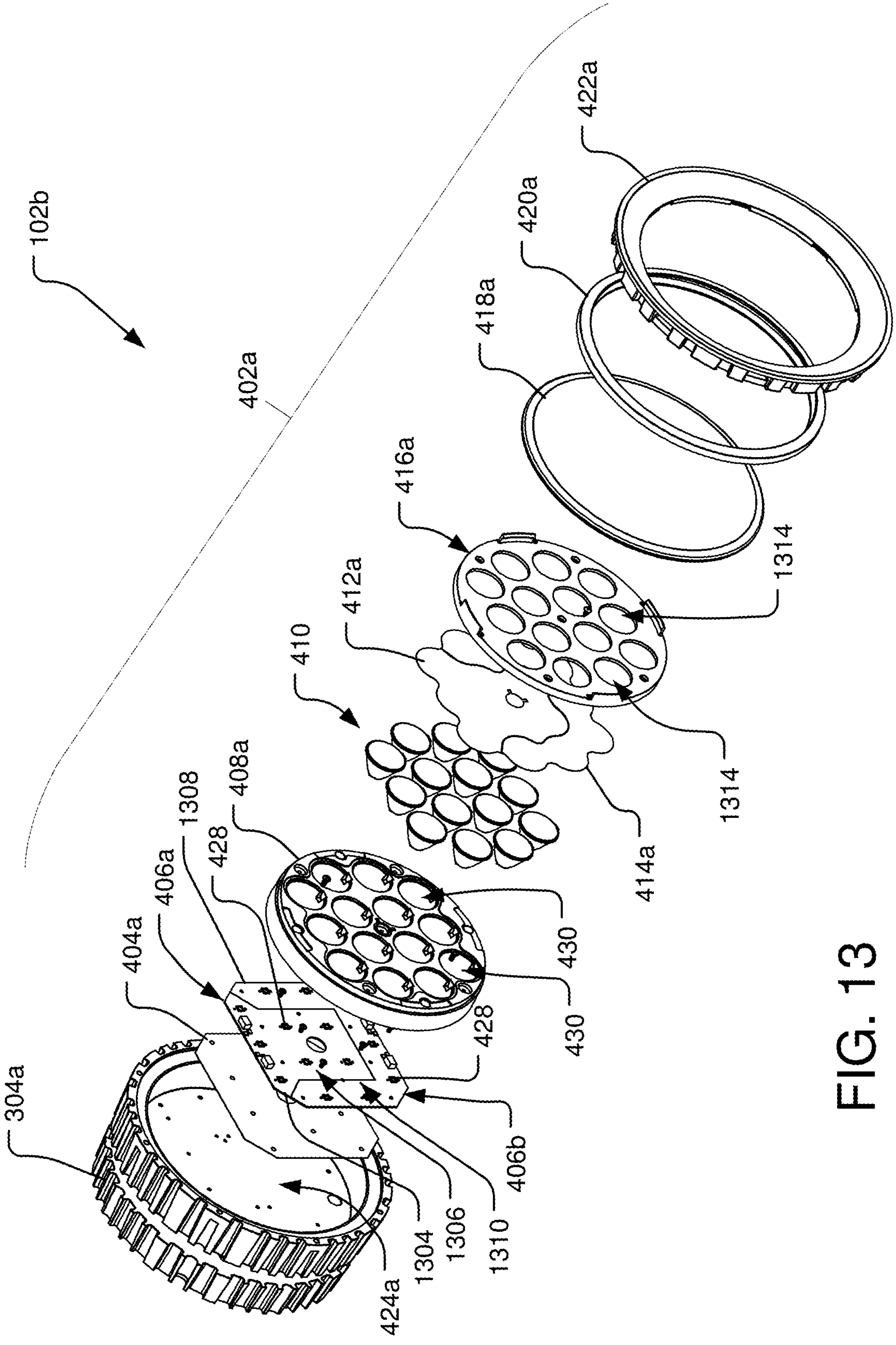
FIG. 13 is front perspective and exploded view of another example embodiment of a lighting unit consistent with the present disclosure.

A lighting unit consistent with the present disclosure may be provided in numerous configurations in view of the present disclosure. FIG. 13, for example, illustrates a lighting unit 102*b* including a housing 304 and a lamp assembly 402*a* consistent with the present disclosure. In the illustrated embodiment, the housing 304 includes a front cavity 424*a* for receiving at least a portion of the lamp assembly 402*a*. The lamp assembly 402*a* includes a gap pad 404*a*, a first PCBA 406*a*, a second PCBA 406*b*, an optic holder 408*a*, a plurality of beam forming optics 410, first 412*a* and second 414*a* beamwidth lenses, an optic retainer 416*a*, a sealing lens 418*a*, a gasket 420*a*, and a retainer 422*a*. In general, the components of the lamp assembly 402*a*, and an associated power supply assembly, are arranged and function as described in connection with the embodiment shown in FIG. 4.

The illustrated example embodiment 102*b*, however, includes first 406*a* and second 406*b* PCBAs as opposed to the single PCBA 406 shown in FIG. 4 and includes a total of 14 solid-state lamps 428 compared to a total of 7 solid-state lamps shown in FIG. 4. The solid-state lamps 428 includes a first group of solid-state lamps mounted on the first PCBA 406 and a second group of solid-state lamps 428 mounted on the second PCBA 406. In the illustrated example embodiment, a total of 7 solid-state lamps 428 are mounted to the PCBA 406*a* to form the first group of solid-state lamps 428 and a total of 7 solid-state lamps 428 are mounted to the second PCBA 406*b* to form the second group of solid-state lamps 428. The ratio of the number of solid-state lamps 428 in the first group to the number of solid-state lamps 428 in the second group is thus 1.0 when the total number of solid-state lamps 428 in the first group (i.e., 7) plus the number of solid-state lamps 428 in the second group (i.e., 7) is equal to the total number of solid-state 428 lamps provided in the lighting unit 102*b* (i.e., 14). The first and second groups of solid-state lamps 428 may be driven by separate drivers of a power supply assembly or may be driven by a single driver. As described in connection with FIG. 4, the solid-state lamps 428 in the first group of solid-state lamps 428 may be configured to emit light of a different color than the light emitted by the solid-state lamps 428 of the second group.

In the illustrated embodiment, the first PCBA 406*a* has a perimeter 1304 defining a projection 1306, and the second PCBA 406*b* has a permitter 1308 defining a central opening 1310. The projection 1306 of the first PCBA 406*a* may be configured to be received in the central opening 1310 of the second PCBA 406*b*. As shown, the portion of the perimeter 1304 of the first PCBA 406*a* defining the projection 1306 may be complementary to the portion of the perimeter 1308 of the second PCBA 406*b* defining the central opening 1310. In this example configuration surfaces defining the perimeter of the projection 1306 are in opposed facing relationship to corresponding surfaces defining the perimeter of the central opening 1310.

As described in connection with FIG. 4, the optic holder 408*a* defines a plurality of receptacles 430 therein for receiving associated ones of the plurality of beam forming optics 410. When the beam forming optics 410 are disposed in associated ones of the receptacles 430, each of the beam forming optics 410 is positioned over an associated one of the solid-state lamps 428 on the first 406*a* or second PCBA 406*b*. Light emitted from each of the solid-state lamps 428 is thus imparted on a bottom surface of an associated one of the beam forming optics 410 and is emitted from a top surface of the associated one of the beam forming optics 410.

The shape of the first beamwidth lens 412*a* generally corresponds to the shape associated with the first group of beam forming optics 410 over which the first beamwidth lens 412*a* is positioned, whereby light emitted from the each of the first group of beam forming optics 410 passes through the first beamwidth lens 412*a*. The shape of the second beamwidth lens 414*a* generally corresponds to the shape associated with the second group of beam forming optics 410 over which the second beamwidth lens is positioned 414*a*, whereby light emitted from the each of the second group of beam forming optics 410 passes through the second beamwidth lens 414*a*.

Figure 14:
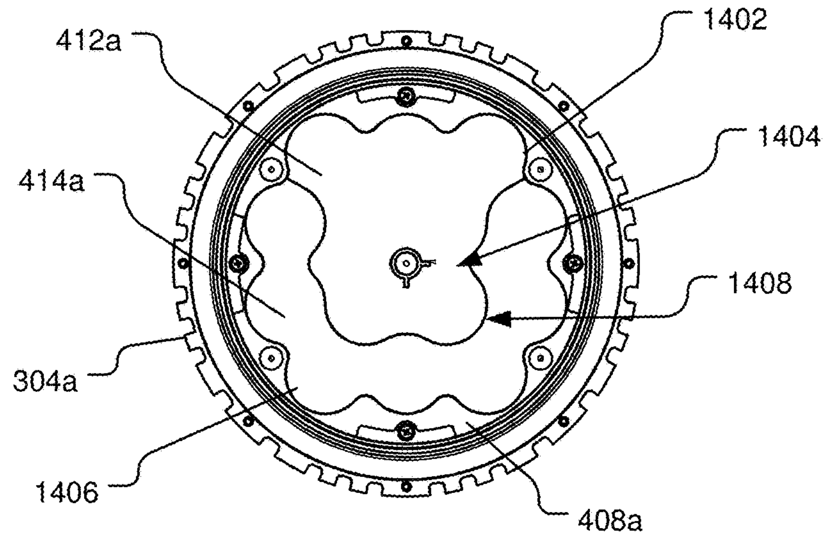
FIG. 14 is a top view of a portion of the lighting unit shown in FIG. 13 showing the first and second beam forming optics positioned over the optic holder.

The first 412*a* and second 414*a* beamwidth lenses are shown more particularly in FIG. 14. As shown, the first beamwidth lens 412*a* has a perimeter 1402 defining a projection 1404, and the second beamwidth lens 414*a* has a permitter 1406 defining a central opening 1408. The projection 1404 of the first beamwidth lens 412*a* may be configured to be received in the central opening 1408 of the second beamwidth lens 414*a*. The portion of the perimeter 1402 of the first beamwidth lens 412*a* defining the projection 1404 is complementary to the portion of the perimeter 1406 of the second beamwidth lens 414*a* defining the central opening 1408. In this example configuration surfaces defining the perimeter of the projection 1404 are in opposed facing relationship to corresponding surfaces defining the perimeter of the central opening 1408 so that light emanating from the beam forming optics 412*a*, 414*a* passes through the first beamwidth lens 412*a* or the second 414*a* beamwidth lens.

Turning again to FIG. 13, the bottom surface of the optic retainer 416*a* is positioned in opposed facing relationship to the top surfaces of the first 412*a* and second 414*a* beamwidth lenses. The optic retainer 416*a* is formed of a generally opaque material having apertures 1314 formed therein corresponding to the locations of the beam forming optics 410 positioned thereunder. Light emitted from the top surface of the beam forming optics 420 passes through an associated one of the beamwidth lenses 412*a*, 414*a* and then through an associated one of the apertures 1314 in the optic retainer 416*a*.

The sealing the lens 418*a* is positioned over the optic retainer 416*a*, and the annular gasket 420*a* is positioned over the sealing lens 418*a*. The sealing lens 418*a* may be an optical structure comprising any of a wide variety of transparent/translucent materials, such as, for example: a polymer, such as poly(methyl methacrylate) (PMMA) or polycarbonate; a ceramic, such as sapphire (Al2O3) or yttrium aluminum garnet (YAG); a glass; and/or any combination thereof. In some embodiments, the sealing lens 418*a* may have optical properties for emitting light having a desired optical property. For example, in some embodiments the sealing lens 418*a* may be configured as a diffuser. In other embodiments, the sealing lens 418*a* may be configured to alter light imparted thereon or provide a light output having a desired beamwidth. Numerous suitable configurations of the sealing lens 418*a* will be apparent in light of the present disclosure.

The retainer 422*a* is positioned over the gasket 420*a* and is secured to the top surface of the housing 304*a*, e.g., by appropriate fasteners. Light emitted through the optic retainer 416*a* passes through the sealing lens 418*a* to provide the output light of the luminaire.

Figure 15:
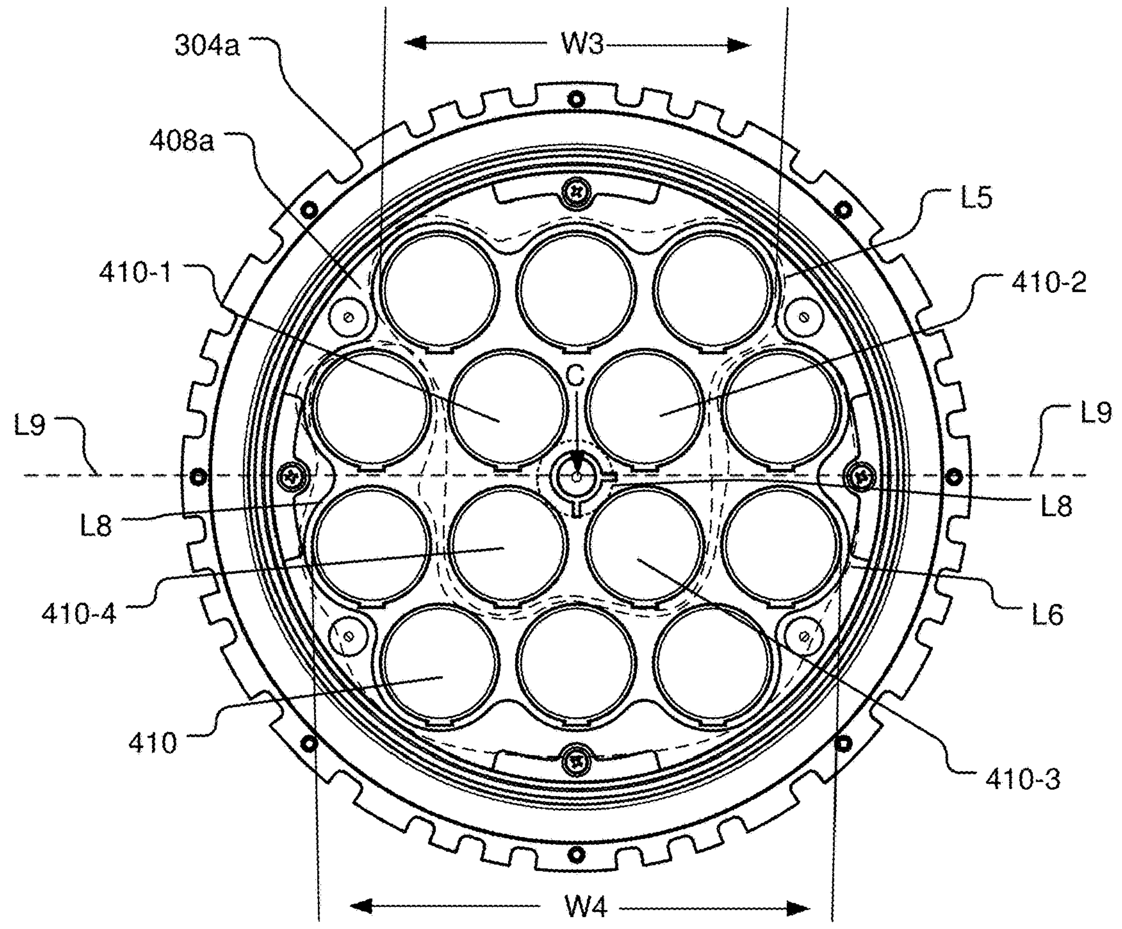
FIG. 15 is a top view of a portion of the lighting unit shown in FIG. 13 showing the optic holder and beam forming optics.

FIG. 15 is a front view of the optic holder and beam forming optics disposed in the housing 304. The beam forming optics 410 includes a first group of beam forming optics, each of which is positioned over an associated one of the first group of solid-state lamps 428 and a second group of beam forming optics 410, each of which is positioned over an associated one of the second group of solid-state lamps 428. For simplicity and ease illustration, the individual beam forming optics in the first group and the second group of beam forming optics are not identified by a distinct associated reference number. However, the first group of beam forming optics 410 is located within the boundaries of a first area indicated by dashed line L5 and the second group of beam forming optics 410 is located within the boundaries of a second area indicated by dashed line L6. The beam forming optics 410 are arranged in a pattern corresponding to the pattern of the solid-state lamps 428 mounted to the first PCB 406*a* and the second PCB 406*b*. Light emitted from the each of the solid-state lamps 428 passes through an associated one of the beam forming optics 410.

The pattern in which the beam forming optics 410 are arranged has a center C. The first group of beam forming optics includes center group of beam forming optic including optics 410-1, 410-2, 410-3 and 410-4 arranged around a central area indicated by the circular dashed line L8. The central area is arranged at the center C of the pattern in which the beam forming optics 410 are arranged. There are no beam forming optics in the central area. The phrase "at the center" as used herein with respect to the location of a group of center beam forming optic with respect to pattern in which all the beam forming optics are arranged means the central area around which the group of center beam forming optics are arranged overlies the center of the pattern and does not require that the center of the central area be precisely aligned with the center of the pattern.

In the illustrated embodiment, the beam forming optics 410 may be considered as being arranged in a circular, hexagonal or other 2-dimensional pattern (in a plan view) where all of the beam forming optics 410 are within the internal area defined by the circle, hexagon or other pattern and the center group 410-1, 410-2, 410-3 and 410-4 of beam forming optics is arranged at the center C of the circle, hexagon or other pattern. For example, the beam forming optics in FIG. 15 may be viewed as being arranged in a pattern generally following line L8 and encompassing all of the beam forming optics 410.

Each of the second group of beam forming optics, i.e., the beam forming optics within the area defined by line L6 in the illustrated example, is further from the center C of the pattern than each of the center group 410-1, 410-2, 410-3 and 410-4 of beam forming optics. In some embodiments, with respect to an imaginary line L9 horizontally bisecting the pattern and extending through the center C of the pattern, there are more complete beam forming optics 410 of the first group of beam forming optics than of the second group of beam forming optics on one side of the line and, on the other side of the line, there are more complete beam forming optics 410 of the second group of beam forming optics than of the first group of beam forming optics.

In some embodiments, the first group beam forming optics 410 is arranged in a first shape and the second the second group of beam forming optics 410 is arranged in a second shape. The second shape may define central opening and at least a portion of the first shape extends into the central opening. In FIG. 15, for example, the first group of beam forming optics may be arranged in a first shape similar to the shape of the first beamwidth lens 412*a* shown in FIG. 14, and the second group of beam forming optics may be arranged in a second shape similar to the shape of the second beamwidth lens 414*a* shown in FIG. 14. The first shape has a projection, similar to the projection 1404 of the first beamwidth lens 412*a* in FIG. 14 and the second shape has a central opening similar to the central opening 1408 of the second beamwidth lens 414*a* in FIG. 14. The projection may of the first shape is received in the central opening of the second shape.

In FIG. 15, the maximum width of the first group of beam forming optics 410 is W3 and the maximum width of the second group of beam forming optics 410 is W4. The width W3 is less than the width W4. In some embodiments, the ratio of the width W3 to W4 is less than or equal to 0.75.

Figure 16:
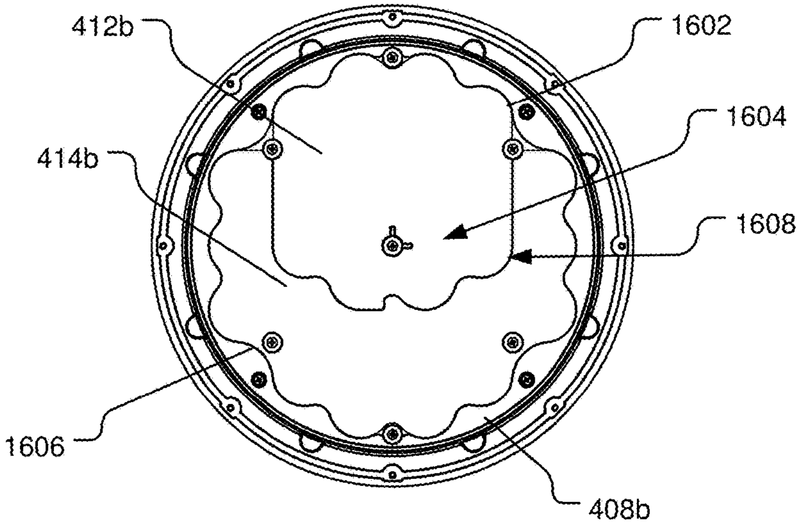
FIG. 16 is a top view of a portion of another example embodiment of a lighting unit consistent with the present disclosure showing the first and second beam forming optics positioned over the optic holder.
Figure 17:
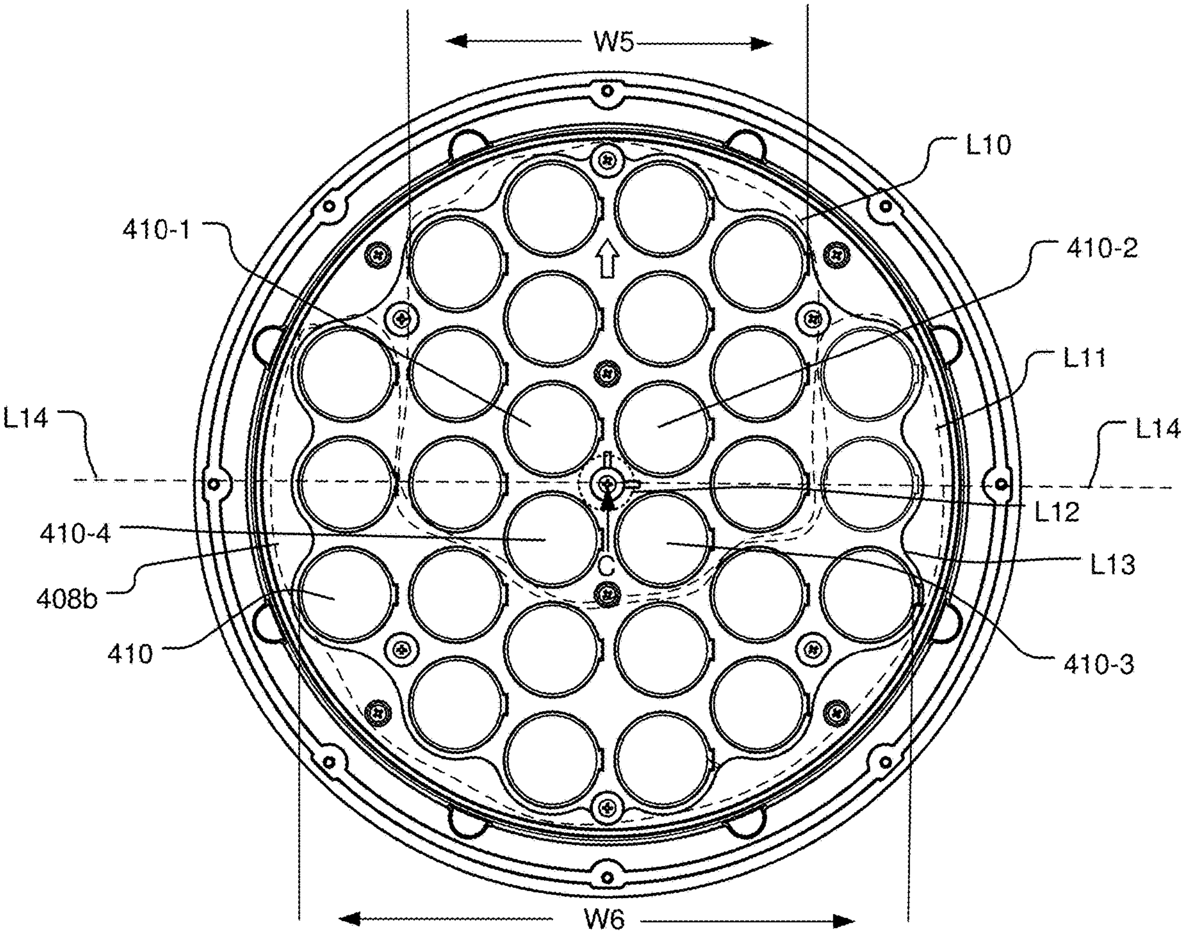
FIG. 17 is a top view of a portion of the lighting unit shown in FIG. 16 showing the optic holder and beam forming optics.

FIGS. 16 and 17 are partial views of another example embodiment consistent with the present disclosure. In general, the illustrated embodiment may include a lens assembly and an associated power supply assembly that are arranged and function as described in connection with the embodiment shown in FIGS. 4 and/or FIG. 13. The illustrated example embodiment, however, includes a total of 28 solid-state lamps 428 and associated beam forming optics 410, compared to a total of 7 solid-state lamps shown in FIG. 4 and 14 solid-state lamps shown in FIG. 13.

FIG. 16 is a front view of the embodiment showing first 412*b* and second 414*b* beam forming optics and positioned on an optic holder 408*b*. As shown, the first beamwidth lens 412*b* has a perimeter 1602 defining a projection 1604, and the second beamwidth lens 414*b* has a permitter 1606 defining a central opening 1608. The projection 1604 of the first beamwidth lens 412*b* may be configured to be received in the central opening 1608 of the second beamwidth lens 414*b*. The portion of the perimeter 1602 of the first beamwidth lens 412*b* defining the projection 1604 is complementary to the portion of the perimeter 1606 of the second beamwidth lens 414*b* defining the central opening 1608. In this example configuration surfaces defining the perimeter of the projection 1604 are in opposed facing relationship to corresponding surfaces defining the perimeter of the central opening 1608 so that light emanating from the beam forming optics 412*b*, 414*b* passes through the first beamwidth lens 412*b* or the second 414*b* beamwidth lens.

FIG. 17 is a front view the optic holder 408*b* and beam forming optics 410. In the illustrated embodiment, there are a total of 28 total beam forming optics 410. The beam forming optics 410 includes a first group of beam forming optics, each of which is positioned over an associated one of the first group of solid-state lamps 428 and a second group of beam forming optics 410, each of which is positioned over an associated one of the second group of solid-state lamps 428. For simplicity and ease illustration, the individual beam forming optics in the first group and the second group of beam forming optics are not identified by a distinct associated reference number. However, the first group of beam forming optics 410 is located within the boundaries of a first area indicated by dashed line L10 and the second group of beam forming optics 410 is located within the boundaries of a second area indicated by dashed line L11. The beam forming optics 410 are arranged in a pattern corresponding to the pattern of solid-state lamps 428 mounted to one or more PCBs. Light emitted from the each of the solid-state lamps 428 passes through an associated one of the beam forming optics 410.

The pattern in which the beam forming optics 410 are arranged has a center C. The first group of beam forming optics includes a center group of beam forming optic including optics 410-1, 410-2, 410-3 and 410-4 arranged around a central area indicated by the circular dashed line L12. The central area is arranged at the center C of the pattern in which the beam forming optics 410 are arranged. There are no beam forming optics in the central area.

In the illustrated embodiment, the beam forming optics 410 may be considered as being arranged in a circular, hexagonal or other 2-dimensional pattern (in a plan view) where all of the beam forming optics 410 are within the internal area defined by the circle, hexagon or other pattern and the center group 410-1, 410-2, 410-3 and 410-4 of beam forming optics is arranged at the center C of the circle, hexagon or other pattern. For example, the beam forming optics in FIG. 17 may be viewed as being arranged in a pattern generally following line L13 and encompassing all of the beam forming optics 410.

Each of the second group of beam forming optics, i.e., the beam forming optics within the area defined by line L11 in the illustrated example, is further from the center C of the pattern than each of the center group 410-1, 410-2, 410-3 and 410-4 of beam forming optics. In some embodiments, with respect to an imaginary line L14 horizontally bisecting the pattern and extending through the center C of the pattern, there are more complete beam forming optics 410 of the first group of beam forming optics than of the second group of beam forming optics on one side of the line and, on the other side of the line, there are more complete beam forming optics 410 of the second group of beam forming optics than of the first group of beam forming optics.

In some embodiments, the first group beam forming optics 410 is arranged in a first shape and the second the second group of beam forming optics 410 is arranged in a second shape. The second shape may define central opening and at least a portion of the first shape extends into the central opening. In FIG. 17, for example, the first group of beam forming optics may be arranged in a first shape similar to the shape of the first beamwidth lens 412*b* shown in FIG. 16, and the second group of beam forming optics may be arranged in a second shape similar to the shape of the second beamwidth lens 414*b* shown in FIG. 16. The first shape has a projection, similar to the projection 1604 of the first beamwidth lens 412*b* in FIG. 16 and the second shape has a central opening similar to the central opening 1608 of the second beamwidth lens 414*b* in FIG. 16. The projection may of the first shape is received in the central opening of the second shape.

In FIG. 17, the maximum width of the first group of beam forming optics 410 is W5 and the maximum width of the second group of beam forming optics 410 is W6. The width W5 is less than the width W6. In some embodiments, the ratio of the width W5 to W6 is less than or equal to 0.75.

Figure 18:
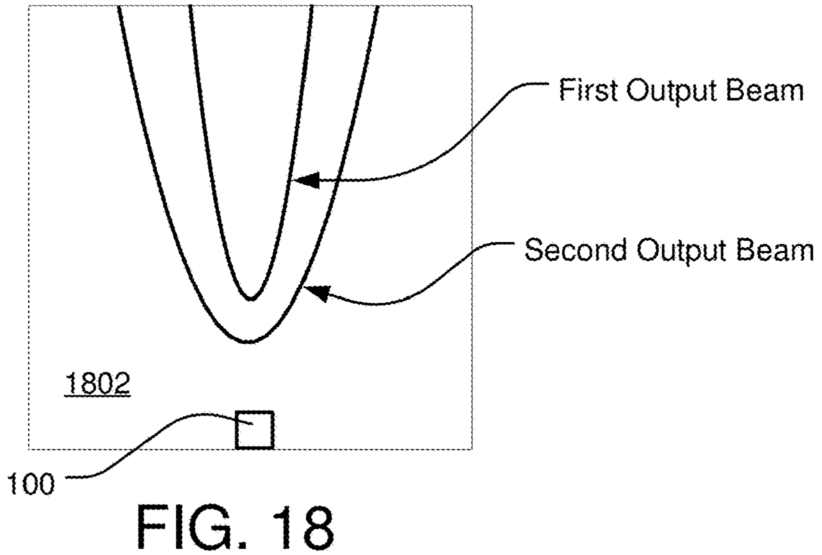
FIG. 18 diagrammatically illustrates one example illumination pattern on a target surface provided by a luminaire consistent with the present disclosure.
Figure 19:
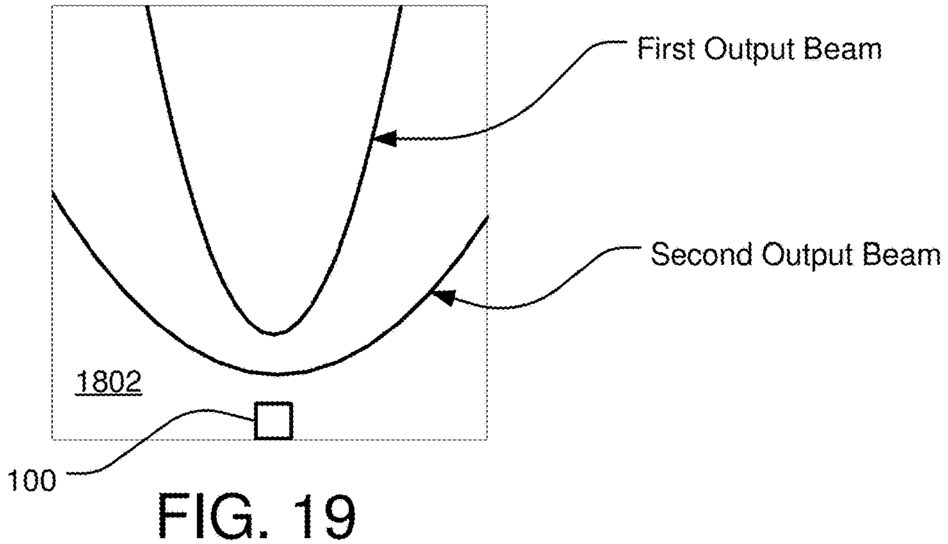
FIG. 19 diagrammatically illustrates another example illumination pattern on a target surface provided by a luminaire consistent with the present disclosure.
Figure 20:
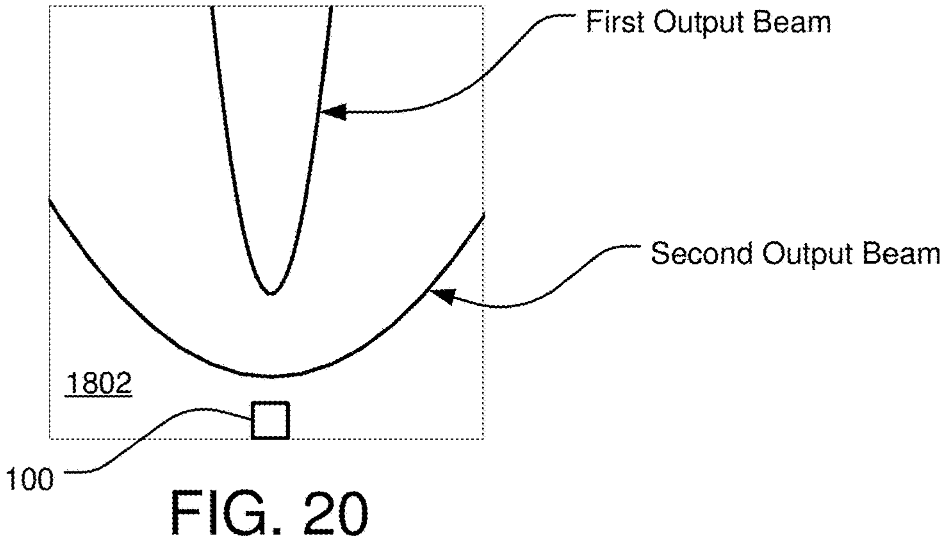
FIG. 20 diagrammatically illustrates another example illumination pattern on a target surface provided by a luminaire consistent with the present disclosure.

FIGS. 18, 19 and 20 diagrammatically illustrate example front elevational views of illumination patterns 1800, 1900, 2000 imparted on a target surface 1802 by a luminaire 100 consistent with the present disclosure. In general, light emitted from the first group of solid-state lamps 428 and the first group of beam forming optics 410 contributes to a first output beam of the luminaire and light emitted from the second group of solid-state lamps 428 and the second group of beam forming optics 410 contributes to a second output beam of the luminaire. The first output beam has a beamwidth B1 that is less than the beamwidth B2 of the second output beam. As a result of the varying beamwidths and the pattern in which the solid-state lamps 428 and the beam forming optics 410 are arranged, the first output beam is centrally positioned in the illumination pattern and the second output beam is outwardly positioned in the illumination pattern. The first and second groups of solid-state lamps 428 may be configured to emit different colors of light. With this configuration, the output illumination pattern 1800, 1900, 2000 produces a decorative flame-like appearance on the target surface.

In some embodiments, the beamwidth lenses 412, 414, 412*a*, 414*a*, 412*b*, 414*b* in a luminaire consistent with the present disclosure may include optical properties selected to produce different associated output beamwidths for the luminaire. Light emitted from the first group of beam forming optics 410 may pass through the first beamwidth lens 412, 412*a*, 412*b* and be emitted from the first beamwidth lens 412, 412*a*, 412*b* within a first desired beamwidth. Light emitted from the second group of beam forming optics 410 may pass through the second beamwidth lens 414, 414*a*, 414*b* and be emitted from the second beamwidth lens 414, 414*a*, 414*b* within a second desired beamwidth. Advantageously, use of the beamwidth lenses 412, 414, 412*a*, 414*a*, 412*b*, 414*b* to achieve a desired output beamwidths for the luminaire allows for facile adjustment of the output beamwidths by selective replacement of the beamwidth lenses 412, 414, 412*a*, 414*a*, 412*b*, 414*b*. In some embodiments, however, the beamwidth lenses 412, 414, 412*a*, 414*a*, 412*b*, 414*b* may be omitted and the output beamwidth of the first and second output beams may be established by the beam forming optics and/or other optical element(s) in the luminaire.

Numerous combinations of output beamwidths may be provided in a luminaire consistent with the present disclosure by selection of the optical properties of the beamwidth lenses 412, 414, 412*a*, 414*a*, 412*b*, 414*b*, the beam forming optics 410 and/or other optical elements. In FIG. 18, for example, the first output beam has a beamwidth of about 15 degrees and the second output beam has a beamwidth of about 30 degrees. FIG. 19 illustrates an example illumination pattern where the first output beam has a beamwidth of about 30 degrees and the second output beam has a beamwidth of about 70 degrees. FIG. 20 illustrates an example illumination pattern where the first output beam has a beamwidth of about 10 degrees and the second output beam has a beamwidth of about 70 degrees.

Numerous embodiments will be apparent in light of this disclosure. One example embodiment provides a luminaire including: a housing; a first group of solid-state lamps disposed in the housing, each of the first group of solid-state lamps being configured to emit light having a first color; a first group of beam forming optics, each of the first group of beam forming optics being positioned over an associated one of the first group of solid-state lamps; a second group of solid-state lamps disposed in the housing, each of the second group of solid-state lamps being configured to emit light having a second color, the second color being different from the first color; and a second group of beam forming optics, each of the second group of beam forming optics being positioned over an associated one of the second group of solid-state lamps. The first group beam forming optics and the second group of beam forming optics may be arranged in a pattern having a center. The first group of beam forming optics includes one or more center beam forming optics arranged at the center, whereby each of the second group of beam forming optics is further from the center than the one or more center beam forming optics.

Another example embodiment provides a method of making a luminaire including: providing a housing; disposing a first group of solid-state lamps in the housing, each of the first group of solid-state lamps being configured to emit light having a first color; positioning a first group of beam forming optics in the housing, each of the first group of beam forming optics being positioned over an associated one of the first group of solid-state lamps; disposing a second group of solid-state lamps in the housing, each of the second group of solid-state lamps being configured to emit light having a second color, the second color being different from the first color; and positioning a second group of beam forming optics in the housing, each of the second group of beam forming optics being positioned over an associated one of the second group of solid-state lamps. The first group beam forming optics and the second group of beam forming optics may be positioned in a pattern having a center. The first group of beam forming optics includes one or more center beam forming optics arranged at the center whereby each of the second group of beam forming optics is further from the center than the one or more center beam forming optics.

Another example embodiment provides a luminaire including: a housing; one or more printed circuit boards dispose in the housing; a first group of solid-state lamps disposed on the one or more printed circuit boards, each of the first group of solid-state lamps being configured to emit light having a first color; a first group of beam forming optics, each of the first group of beam forming optics being positioned over an associated one of the first group of solid-state lamps; a second group of solid-state lamps disposed on the one or more printed circuit boards, each of the second group of solid-state lamps being configured to emit light having a second color, the second color being different from the first color; a second group of beam forming optics, each of the second group of beam forming optics being positioned over an associated one of the second group of solid-state lamps; a first beamwidth lens positioned over each of the first group of beam forming optics, the first beamwidth lens being configured to receive light from the first group of beam forming optics to provide a composite light output having a first beamwidth; and a second beamwidth lens positioned over each of the second group of beam forming optics, the second beamwidth lens being configured to receive light from the second group of beam forming optics to provide a composite light output having a second beamwidth, the second beamwidth being nominally different from the first beamwidth. The first group beam forming optics and the second group of beam forming optics may be arranged in a pattern having a center. The first group of beam forming optics includes one or more center beam forming optics arranged at the center, whereby each of the second group of beam forming optics is further from the center than the one or more center beam forming optics. A ratio of a total number of the first group of solid-state lamps disposed in the housing to a total number of the second group of solid-state lamps disposed in the housing may be greater than or equal to 0.6 and less than or equal to 1.2 when the number of solid-state lamps in the first group plus the number of solid-state lamps in the second group is equal to a total number of solid-state lamps provided in the luminaire. A maximum width of the first group of beam forming optics is less than a maximum width of the second group of beam forming optics. With respect to a line horizontally bisecting the pattern an extending through the center, there are more complete beamwidth lenses of the first group compared to complete beamwidth lenses of the second group on one side of the line and there are more complete beamwidth lenses of the second group compared to complete beamwidth lenses of the first group on an opposite side of the line.

Another example embodiment provides a luminaire including: a housing; a first group of solid-state lamps disposed in the housing, each of the first group of solid-state lamps being configured to emit light having a first color; a first group of beam forming optics, each of the first group of beam forming optics being positioned over an associated one of the first group of solid-state lamps; a first beamwidth lens positioned over each of the first group of beam forming optics, the first beamwidth lens being configured to receive light from the first group of beam forming optics to provide a composite light output having a first beamwidth; a second group of solid-state lamps disposed in the housing, each of the second group of solid-state lamps being configured to emit light having a second color, the second color being different from the first color; a second group of beam forming optics, each of the second group of beam forming optics being positioned over an associated one of the second group of solid-state lamps; and a second beamwidth lens positioned over each of the second group of beam forming optics, the second beamwidth lens being configured to receive light from the second group of beam forming optics to provide a composite light output having a second beamwidth, the second beamwidth being nominally different from the first beamwidth.

Another example embodiment provides a method of making a luminaire including: providing a housing; disposing a first group of solid-state lamps in the housing, each of the first group of solid-state lamps being configured to emit light having a first color; positioning a first group of beam forming optics in the housing, each of the first group of beam forming optics being positioned over an associated one of the first group of solid-state lamps; positioning a first beamwidth lens over each of the first group of beam forming optics, the first beamwidth lens being configured to receive light from the first group of beam forming optics to provide a composite light output having a first beamwidth; disposing a second group of solid-state lamps in the housing, each of the second group of solid-state lamps being configured to emit light having a second color, the second color being different from the first color; positioning a second group of beam forming optics in the housing, each of the second group of beam forming optics being positioned over an associated one of the second group of solid-state lamps; and positioning a second beamwidth lens over each of the second group of beam forming optics, the second beamwidth lens being configured to receive light from the second group of beam forming optics to provide a composite light output having a second beamwidth.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

It is, therefore, to be understood that the foregoing embodiments are presented by way of example only and that, within the scope of the appended claims and equivalents thereto, the invention may be practiced otherwise than as specifically described and claimed. The present invention is directed to each individual feature, embodiment, system, article, material, kit, and/or method described herein. In addition, any combination of two or more such features, embodiments, systems, articles, materials, kits, and/or methods, if such features, systems, articles, materials, kits, and/or methods are not mutually inconsistent, is included within the scope of the present invention.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

As used herein, use of the term "nominal" or "nominally" when referring to an amount means a designated or theoretical amount that may vary from the actual amount.

Spatially relative terms, such as "beneath," below," upper," "lower," "above", "left", "right" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Although the terms "first," "second," "third" etc. may be used to describe various elements, components, regions, layers and/or sections, these elements, components, regions, layers and/or sections are not to be limited by these terms as they are used only to distinguish one element, component, region, layer or section from another element, component, region, layer or section. Thus, a first element, component, region, layer or section could be termed a second element, component, region, layer or section without departing from the scope and teachings of the present invention.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A luminaire comprising:

a housing;

a first group of solid-state lamps disposed in the housing, each of the first group of solid-state lamps being configured to emit light having a first color;

one or more first beam forming optics configured to be always positioned over the first group of solid-state lamps;

a second group of solid-state lamps disposed in the housing, each of the second group of solid-state lamps being configured to emit light having a second color, the second color being different from the first color;

one or more second beam forming optics configured to be always positioned over the second group of solid-state lamps;

at least one first beamwidth lens is configured to be rotationally fixed relative to the one or more first beam forming optics, the at least one first beamwidth lens being configured to receive light from the one or more first beam forming optics to provide a composite light output having a first beamwidth; and at least one second beamwidth lens is configured to be rotationally fixed relative to the one or more second beam forming optics, the at least one second beamwidth lens being configured to receive light from the one or more second beam forming optics to provide a composite light output having a second beamwidth, the second beamwidth being nominally wider than the first beamwidth.

2. The luminaire of claim 1, wherein the one or more first beam forming optics and the one or more second beam forming optics are arranged in a pattern having a center, the one or more first beam forming optics extending from a perimeter of the pattern and including one or more center beam forming optics arranged at the center whereby each of the one or more second beam forming optics is further from the center than the one or more center beam forming optics.

3. The luminaire of claim 2, wherein the one or more center beam forming optics comprises a single one of the one or more first beam forming optics.

4. The luminaire of claim 2, wherein the one or more first beam forming optics includes a plurality of first beam forming optics, and wherein the one or more center beam forming optics comprises a plurality of the plurality of first beam forming optics arranged around a central area, the central area being positioned at the center.

5. The luminaire of claim 1, wherein the one or more first beam forming optics includes a plurality of first beam forming optics.

6. The luminaire of claim 1, wherein the one or more first beam forming optics includes only a single first beam forming optic.

7. The luminaire of claim 1, wherein the one or more second beam forming optics includes a plurality of second beam forming optics.

8. The luminaire of claim 1, wherein the one or more second beam forming optics includes only a single second beam forming optic.

9. The luminaire of claim 1, wherein a ratio of a maximum width of the one or more first beam forming optics to a maximum width of the one or more second beam forming optics is less than 0.75.

10. The luminaire of claim 1, wherein the one or more first beam forming optics is a single first beam forming optic configured to emit light having a first beamwidth and the one or more second beam forming optics is a single second beam forming optic configured to emit light having a second beamwidth, the first beamwidth being nominally the same as the second beamwidth.

11. The luminaire of claim 1, wherein the one or more first beam forming optics is a single first beam forming optic configured to emit light having a first beamwidth and the one or more second beam forming optics is a single second beam forming optic configured to emit light having a second beamwidth, the first beamwidth being nominally different from the second beamwidth.

12. The luminaire of claim 1, wherein the at least one first beamwidth lens comprises a single first beamwidth lens positioned over each of the one or more first beam forming optics, and wherein the at least one second beamwidth lens comprises a single second beamwidth lens positioned over each of the one or more second beam forming optics.

13. The luminaire of claim 1, wherein the one or more first beam forming optics includes a plurality of first beam forming optics, the one or more second beam forming optics includes a plurality of second beam forming optics, each of the plurality of first beam forming optics configured to emit light having a first beamwidth and each of the plurality of second beam forming optics configured to emit light having a second beamwidth, the first beamwidth being nominally the same as the second beamwidth.

14. The luminaire of claim 1, wherein the one or more first beam forming optics includes a plurality of first beam forming optics, the one or more second beam forming optics includes a plurality of second beam forming optics, each of the plurality of first beam forming optics configured to emit light having a first beamwidth and each of the plurality of second beam forming optics configured to emit light having a second beamwidth, the first beamwidth being nominally different from the second beamwidth.

15. A luminaire configured to generate an illumination pattern on a target surface, the illumination pattern defined, at least in part, by a first output beam and a second output beam emitted from the luminaire, the luminaire comprising:

a housing;

a first group of solid-state lamps disposed in the housing, each of the first group of solid-state lamps being configured to emit light having a first color;

one or more first beam forming optics including at least one first bottom surface and at least one first top surface, wherein the at least one first bottom surface and the at least one first top surface are configured to be rotationally fixed relative to the first group of solid-state lamps such that the at least one first bottom surface is configured to receive light emitted directly from the first group of solid-state lamps and the at least one first top surface is configured to emit the first output beam from the luminaire having a first beamwidth;

a second group of solid-state lamps disposed in the housing, each of the second group of solid-state lamps being configured to emit light having a second color, the second color being different from the first color;

one or more second beam forming optics including at least one second bottom surface and at least one second top surface, wherein the at least one second bottom surface and the at least one second top surface are configured to be rotationally fixed relative to the second group of solid-state lamps such that the at least one second bottom surface is configured to receive light emitted directly from the second group of solid-state lamps and the at least one second top surface is configured to emit the second output beam from the luminaire having a second beamwidth, wherein the first beamwidth is nominally different from the second beamwidth.

16. The luminaire of claim 15, wherein the one or more first beam forming optics includes a plurality of first beam forming optics.

17. The luminaire of claim 15, wherein the one or more first beam forming optics includes only a single first beam forming optic.

18. The luminaire of claim 15, wherein the one or more second beam forming optics includes a plurality of second beam forming optics.

19. The luminaire of claim 15, wherein the one or more second beam forming optics includes only a single second beam forming optic.

20. The luminaire of claim 15, wherein the one or more first beam forming optics and the one or more second beam forming optics are arranged in a pattern having a center, the one or more first beam forming optics extending from a perimeter of the pattern and including one or more center beam forming optics arranged at the center whereby each of the one or more second beam forming optics is further from the center than the one or more center beam forming optics.

* * * * *